(12) United States Patent
Goodman et al.

(10) Patent No.: US 10,676,278 B2
(45) Date of Patent: *Jun. 9, 2020

(54) DRONE BASED METHODS AND SYSTEMS FOR TRANSFER OF DATA STORAGE CARTRIDGES IN AN AUTOMATED DATA STORAGE LIBRARY SYSTEM

(71) Applicant: International Business Machines Corporation, Armonk, NY (US)

(72) Inventors: Brian G. Goodman, Tucson, AZ (US); Tom Haberman, Tucson, AZ (US); Michael P. McIntosh, Tucson, AZ (US); Shawn M. Nave, Tucson, AZ (US); Kenny Nian Gan Qiu, Tucson, AZ (US); George G. Zamora, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,788

(22) Filed: Dec. 1, 2017

(65) Prior Publication Data

US 2019/0168963 A1 Jun. 6, 2019

(51) Int. Cl.
*G11B 15/68* (2006.01)
*B65G 1/04* (2006.01)
*G11B 17/22* (2006.01)

(52) U.S. Cl.
CPC ............ *B65G 1/0464* (2013.01); *G11B 15/68* (2013.01); *G11B 17/22* (2013.01)

(58) Field of Classification Search
None
See application file for complete search history.

(56) References Cited

U.S. PATENT DOCUMENTS 8,400,728 B2 3/2013 Thompson et al.
9,202,507 B1 12/2015 Krick et al.
(Continued)

FOREIGN PATENT DOCUMENTS

EP 2886493 B1 10/2016
FR 3007394 A1 12/2014

OTHER PUBLICATIONS

Goodman,Brian G. et al., "Automated Data Storage Library Drone Accessor", U.S. Appl. No. 15/828,807, filed Dec. 1, 2017, not yet published.
(Continued)

*Primary Examiner* — Mark C Hageman
(74) *Attorney, Agent, or Firm* — Scully, Scott, Murphy & Presser, P.C.; Alvin Borromeo, Esq.

(57) ABSTRACT

A data storage system that moves and transfers components utilizing drone systems is disclosed. In one embodiment, the system includes a plurality of data storage libraries comprising a first data storage library for the storage, reading, and writing of data on a plurality of data storage cartridges and a second data storage library for the storage of data on a plurality of data storage cartridges, and at least one drone vehicle. The system also includes a processing device and a non-transitory, computer-readable memory containing programming instructions. The programming instructions are configured to cause the processing device to receive a request to transfer a data storage component to a destination location, in response to receiving the request, instruct a drone vehicle to transfer the data storage component to the destination location, and transfer the data storage component to the destination location by the drone vehicle.

20 Claims, 11 Drawing Sheets

(56) References Cited

U.S. PATENT DOCUMENTS

| | | | |
|---|---|---|---|
| 9,487,356 B1* | 11/2016 | Aggarwal | B64C 39/024 |
| 9,975,651 B1* | 5/2018 | Eck | B64F 1/32 |
| 2007/0211366 A1 | 9/2007 | Chamorro et al. | |
| 2013/0259617 A1 | 10/2013 | Wang | |
| 2015/0050106 A1 | 2/2015 | Thompson et al. | |
| 2015/0175276 A1* | 6/2015 | Koster | B64F 1/32 |
| | | | 244/114 R |
| 2015/0231783 A1 | 8/2015 | Miller et al. | |
| 2016/0257423 A1* | 9/2016 | Martin | B64F 1/00 |
| 2016/0280460 A1 | 9/2016 | Porat | |
| 2017/0043953 A1 | 2/2017 | Battles et al. | |
| 2017/0190510 A1 | 7/2017 | Porat | |
| 2017/0293439 A1 | 10/2017 | Basham et al. | |
| 2017/0320572 A1* | 11/2017 | High | B64C 39/024 |
| 2017/0323253 A1 | 11/2017 | Enssle et al. | |
| 2018/0075873 A1 | 3/2018 | Macias et al. | |
| 2018/0137456 A1 | 5/2018 | Fan et al. | |
| 2018/0196422 A1 | 7/2018 | Chow et al. | |
| 2018/0284760 A1 | 10/2018 | Gupta et al. | |
| 2019/0152701 A1* | 5/2019 | Eck | B65G 1/06 |

OTHER PUBLICATIONS

Goodman, Brian G. et al., "Methods and Systems for Transfer of Data Storage Components in an Automated Data Storage System Using Drones", U.S. Appl. No. 15/828,815, filed Dec. 1, 2017, not yet published.

* cited by examiner

DRONE BASED METHODS AND SYSTEMS FOR TRANSFER OF DATA STORAGE CARTRIDGES IN AN AUTOMATED DATA STORAGE LIBRARY SYSTEM

BACKGROUND

The present invention relates to a data storage library for the storage and transfer of data, and more specifically, to a data storage library system that moves and transfers components (e.g., data storage cartridges, data storage magazines, etc.) utilizing drone systems.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including, but not limited to, magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

Automated data storage libraries typically comprise data storage cartridge slots and cells to store and hold one or more data storage cartridges, and data storage drives that store data to, and/or retrieve data from, the media associated with the data storage cartridges. Data storage cartridge slots in a data storage library can be grouped into one or more frames and a library can include several frames each storing, for example, the same or different media types. Further, automated data storage libraries typically comprise import/export (I/O) stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to and from the data storage drives and/or I/O stations by moving, for example, in the horizontal (X) and vertical (Y) directions.

A robotic accessor in a data storage system typically traverses the array of data storage cartridge slots and cells using carousel structures, draw cable devices, and track/rail type systems. These systems may have a guide rail (or track) and a carriage (e.g., an accessor) that moves the data storage cartridges to and from the data storage drives. The guide rail forms a path for directing the carriage to any desired position, be it in a continuous loop of a carousel, a straight line, or other combinations of straight and curved sections.

Each data storage library typically has a finite capacity for data storage cartridges, so if the overall capacity requirements of a customer exceeds the finite capacity of the data storage library, additional frames and/or a plurality of data storage libraries may have to be used and/or connected together in order to meet the capacity requirements of the customer. One method of creating large data storage libraries is to generate long library strings or banks where multiple library storage units are arranged adjacent one another and pass-through ports are provided for passing data storage cartridges from one library storage module or frame to another adjacent library storage module or frame. In this arrangement, the host computer can direct a library storage module not having a data storage cartridge drive to pass a data storage cartridge to an adjacent library storage module where it is picked up by the robotic arm of the adjacent library storage module and transported to and inserted in a data storage drive of the adjacent library storage module. This arrangement obviously provides advantages to managers of large amounts of data who are able to simply add additional library storage modules as their need for data storage grows.

However, traditional pass-through mechanisms take space away from the primary function of the library storage module (that is storing data storage cartridges), initially are expensive to manufacture and install, are more expensive to maintain over the useful life of the library storage module, and require a library control unit to interpret and convey commands between a host computer and the library control unit of each library storage module.

SUMMARY

In an embodiment, a data storage system that moves and transfers components (e.g., data storage cartridges, data storage magazines, etc.) utilizing drone systems is disclosed. The system comprises a plurality of data storage libraries comprising a first data storage library for the storage, reading, and writing of data on a plurality of data storage cartridges and a second data storage library for the storage of data on a plurality of data storage cartridges, and at least one drone vehicle. The system also includes a processing device and a non-transitory, computer-readable memory containing programming instructions. The programming instructions are configured to cause the processing device to receive a request to transfer a data storage component to a destination location, in response to receiving the request, instruct a drone vehicle to transfer the data storage component to the destination location, and transfer the data storage component to the destination location by the drone vehicle.

In an embodiment, each of the plurality of data storage libraries may comprise a data storage drive, a plurality of data storage slots, a library controller, at least one of the group consisting of an import/export (I/O) station, a pass-through portal, a magazine slot and combinations thereof, one or more frames, and a docking station configured to associate with a drone vehicle. In some embodiments, docking station may include a docking structure, and a power source configured to supply power to a drone vehicle associated with the docking station. The docking station may also include a coupling interface configured to operably couple the docking station to the data storage library. In certain embodiments, the docking structure also comprises one or more docking aids that are configured to engage one or more landing structures of a drone and form a stable attachment. Examples of such docking aids may include, without limitation, slots, brackets, wedges, channels, tethers, grooves, recesses, latches, hooks, pins, and magnetic docking aids configured to exert an electromagnetic field, and combinations thereof.

In an embodiment, the at least one drone vehicle may comprise a flight assembly, a frame, one or more landing structures, a power source, a package holding and securing assembly; and a control unit comprising a processing device and a memory. In certain embodiments, the package holding and securing assembly may include a gripper assembly configured to perform one or more of retrieving, releasing, and/or holding a data storage component. In some embodiments, the package holding and securing assembly may also include at least one of the group consisting of a storage slot, a magazine slot, and a holding structure for holding a data storage component during transfer. In an embodiment, the data storage system may further include a scanner module configured to read information from a data storage component.

In some embodiments, the destination location may include, for example, an I/O station of a data storage library, an accessor of a data storage library, and/or a pass-through portal of a data storage library.

In yet other embodiments, the data storage system further comprises a vault storage configured for long-term storage of a plurality of data storage cartridges. In such embodiments, the destination location may include, for example, a vault storage cell, a vault magazine slot, and/or a vault I/O station.

According to another embodiment of the disclosure, a drone vehicle for transferring data storage components in a data storage system is disclosed. The drone vehicle comprises a flight assembly, a frame, at least one landing structure, a package holding and securing assembly configured to hold and release a data storage component, a power source, a processing device; and a non-transitory, computer-readable memory containing programming instructions. The programming instructions may be are configured to cause the processing device to: receive a command for transferring a data storage component from a source location to a destination location, by the package securing system, cause the drone vehicle to hold the data storage component, and by the flight assembly, cause the drone vehicle to move to the destination location. The drone vehicle is configured to move and transfer data storage components to and from a data storage library in a data storage system.

In some embodiments, the at least one landing structure may include one or more landing sensors. Examples of landing sensors may include, without limitation, an optical sensor, a radio sensor, a contact sensor, a proximity sensor, an acceleration sensor, a pressure sensor, and/or combinations thereof.

In certain embodiments, the package holding and securing assembly may include a gripper assembly configured to perform one or more of retrieving, releasing, and/or holding a data storage component. In some embodiments, the package holding and securing assembly may also include a holding structure for holding a data storage component during transfer.

In an embodiment, the drone vehicle may also include a scanner module configured to retrieve information from a data storage cartridge.

In some embodiments, the drone vehicle is further configured to move and transfer data storage components to and from a vault storage in the data storage system.

According to another embodiment of the disclosure, a method for transferring data storage components within a data storage system is disclosed. The method may include instructing a drone vehicle to transfer a data storage component to a destination location, and transferring the data storage component to the destination location by the drone vehicle, wherein the destination location comprises at least one of the group consisting of a data storage library and a vault storage.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1A:
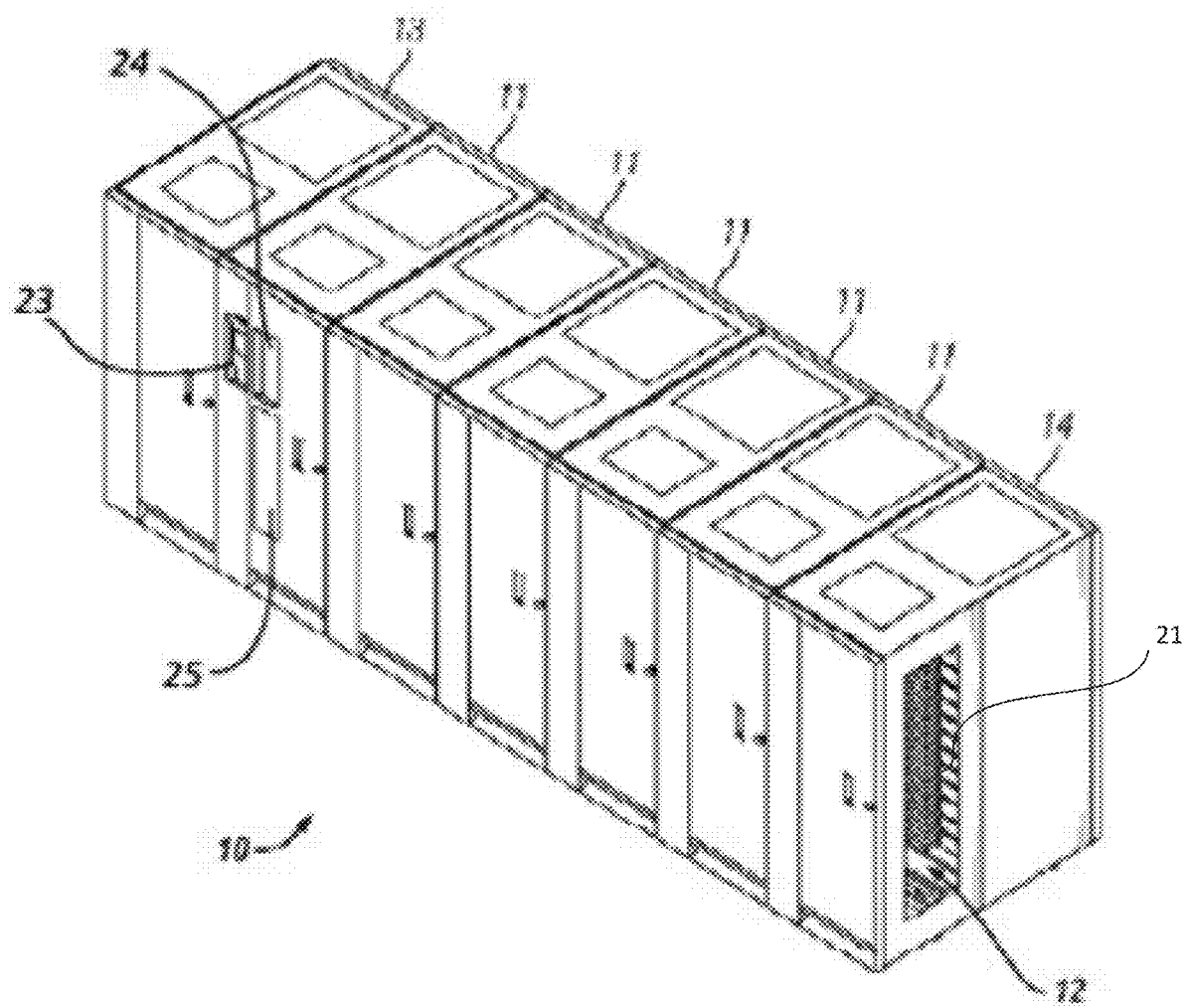
FIG. 1A is a perspective view of one embodiment of an automated data storage library.
Figure 1B:
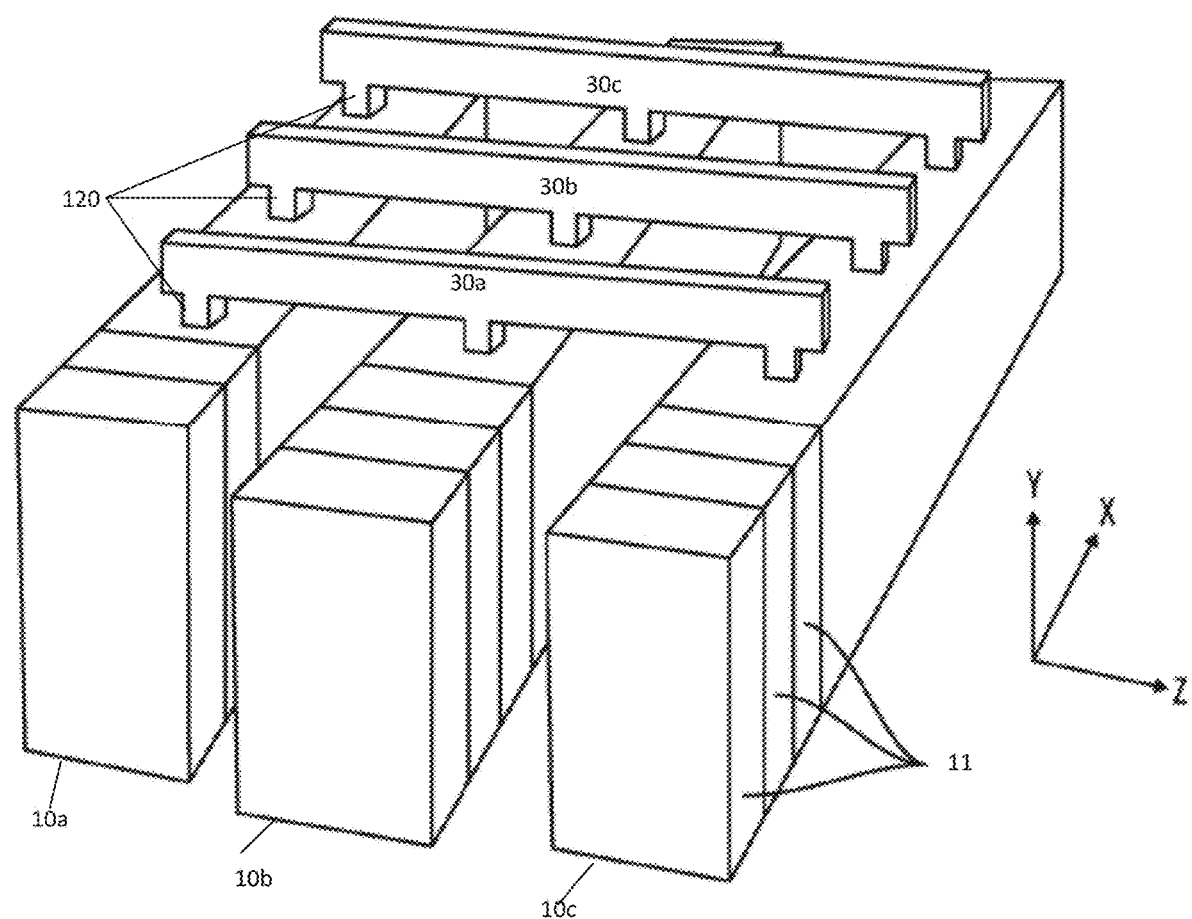
FIG. 1B is a perspective view of yet another embodiment of an automated data storage system illustrating multiple libraries connected using external pass-through mechanisms.
Figure 2:
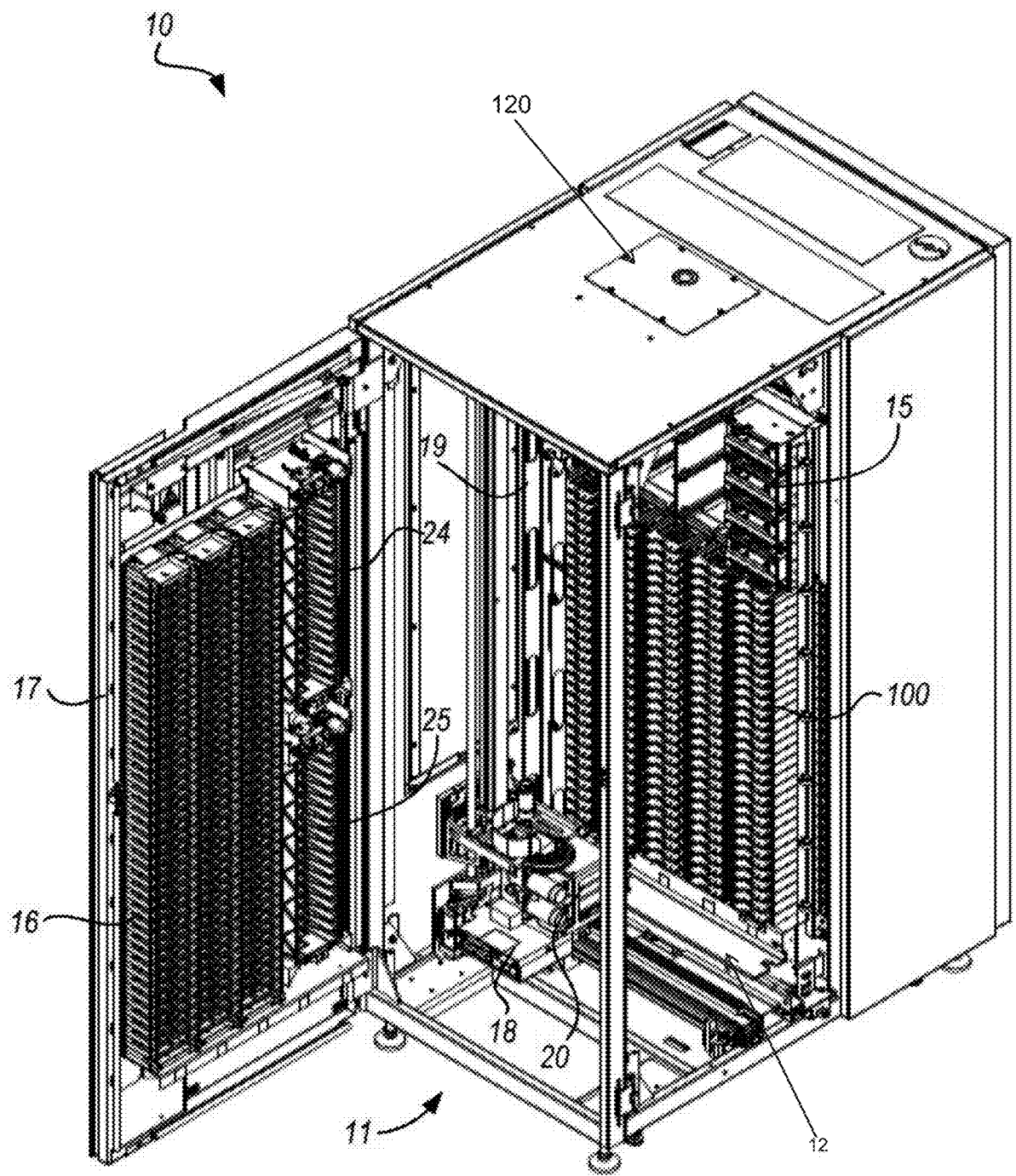
FIG. 2 is a perspective view of a data storage frame from the data storage library of FIG. 1.

FIGS. 1A & 1B, and FIG. 2 illustrate an example of a data storage system, e.g., an automated data storage library 10, which stores and retrieves data storage cartridges, containing data storage media (not shown), from multi-cartridge deep slot storage slots 100 and single cartridge storage slots 16. Herein, storage slot and storage cell refer to a location that may hold a data storage cartridge and the terms may be used interchangeably. Data storage library 10 also includes data storage drives 15 which read data from and/or write data to data storage cartridges. Examples of an automated data storage library which has a similar configuration as that depicted in FIGS. 1A & 1B, and FIG. 2, and may be implemented with some of the various approaches herein may include IBM TS4500 Tape Library or the IBM TS3500 Tape Library. The library 10 may comprise a single frame 11 (as shown in FIG. 2) or multiple frames (as shown in FIGS. 1A and 1B).

The library 10 of FIG. 1A comprises a left hand service bay 13, one or more storage frames 11, and right hand service bay 14. A frame 11 may comprise an expansion component of a library. The storage frames may be added or removed to expand or reduce the size and/or functionality of the library.

FIG. 2 shows an exemplary embodiment of a storage frame 11, which may act as the base frame of the library 10. The storage frame 11 illustrated in FIG. 2 may have only a single robotic accessor 18 (i.e., there are no redundant accessors) to transport the data storage cartridges between the data storage slots, data storage drives, I/O stations, etc. The storage frame 11 in FIG. 2 has no service bays. In other embodiments, a storage frame may include multiple robotic accessors and the data storage library may have one or more service bays. The service bays 13, 14 act as a garage for holding the accessor away from the normal operating space during service or when the other accessor needs to gain access to data storage media or data storage drives that are close in proximity to the service bay.

Referring now to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than that illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first robotic accessor 18 may be used to transport data storage cartridges containing data storage media between the plurality of storage slots 16, the multi-cartridge deep slot cells 100, the data storage drive(s) 15, the I/O stations 24, 25, and/or pass-through mechanism portal 120 that may be associated with the library 10. The robotic accessor 18 moves within channel or aisle 12 formed in the data storage frame. According to various approaches, the data storage drives 15 may be optical tape or disk drives, magnetic tape or disk drives, electronic media drive, or other types of data storage drives that read and/or write data with respect to the data storage media. Storage frame 11 may also include an input or import station 24 and an output or export station 25 for transporting or transferring components such as data storage cartridges or data storage magazines in and out of the library 10. The accessor 18 may include a gripper 20 for retrieving, grabbing and/or releasing data storage cartridges, data storage magazines, or other components. Herein, a magazine refers to an assembly, structure or housing that can hold two or more data storage cartridges and can be removed or installed in one or more locations, i.e., a magazine slot (not shown here) in a data storage library.

As illustrated in FIG. 1A, the storage frame 11 may optionally include an operator panel 23 or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

As data storage needs grow, customers move to larger and larger libraries. Many automated data storage libraries are expandable by adding storage modules/frames 11 that may also contain additional data storage slots and drives. As shown in FIG. 1A, a frame 11 may comprise an expansion component of the library. Thus, storage frames 11 may be added or removed to expand or reduce the size and/or functionality of the library. According to different approaches, frames 11 may include additional storage slots 16, deep storage slot cells 100, data storage drives 15, import/export (I/O) stations 24/25, accessors 18, operator panels, controller cards, communication cards, etc.

The transport of data storage cartridges between storage frames 11, bays 13/14 and/or libraries is typically accomplished by a robotic accessor. In addition, automated data storage libraries may support more than one accessor for improved performance and/or improved reliability. Two basic approaches to the use of multiple accessors in data storage libraries are commonly used. In one case, each module may contain a "pass through" port (e.g., 120 in FIG. 1B) or passageways (e.g., 12 in FIG. 1A and FIG. 2) that allows a cartridge to be moved from one module (or frame) to another. In the second case, two or more accessors share the entire space of data storage library so that any accessor could access any data storage cartridge. For example, multiple libraries may be connected together with internal channels (FIG. 1A) or pass-through mechanisms (FIG. 1B) for transporting data storage cartridges between the multiple frames 11 and/or bays 13/14. For example, in one embodiment, an accessor aisle or channel 12 preferably extends between the storage frames 11 and bays 13, 14 of the embodiment in FIG. 1A thereby allowing a robotic accessor 18 to move between frames and/or bays to transport data storage cartridges. When multiple frames 11 are connected together, the track upon which the robotic accessor is riding on or attached to typically extends between the frames in the internal channel (or aisle) 12 so that the accessor can move between the library frames. A moveable and/or deployable panel 21 may be displaced to cover and/or block (as well uncover and/or unblock) aisle 12 from communicating with the exterior of the data storage library. Panel 21 may be moved and/or removed to permit access to the interior of the service bays 13, 14 and/or storage frames 11. Panel 21 may comprise a window to permit visibility into the library 10. It will be appreciated that one or more channels may be associated with the library.

Data storage libraries and frames typically have a maximum configuration before multiple libraries have to be connected together with pass-through-mechanisms for transporting data storage cartridges between the library frames. FIG. 1B shows multiple libraries connected together with external pass-through mechanisms for transporting data storage cartridges between the multiple libraries. While, in FIG. 1B, three data storage libraries 10a, 10b, and 10c are coupled via three external pass-through mechanisms 30a, 30b, and 30c, it will be appreciated that in alternative embodiments more or less data storage libraries and pass-through mechanisms may be present. For example, in certain embodiments, ten data storage libraries may be coupled via two pass-through mechanisms. As shown in FIG. 1B, the pass-through mechanisms 30a, 30b, and 30c are in an overhead position over the data storage libraries. For example, data storage libraries may be placed on a floor of a room, and the pass-through mechanisms may be placed between the ceiling of the room and the top of the data storage libraries while still allowing walking access to operator or service personnel underneath the pass-through mechanisms 30a, 30b, and 30c. In certain alternative embodiments, the pass-through mechanisms 30a, 30b, and 30c can be configured to be below the data storage libraries. Still further, libraries may be butted up against each other and pass-through mechanisms may be located on adjacent or adjoining walls of two different libraries. Other configurations for the pass-through mechanisms and data storage libraries are contemplated.

In an embodiment of FIG. 1B, a data storage cartridge that is initially in a library frame 11 of a first library may be placed by a robotic system (such as an accessor assembly discussed below) in a pass-through portal 120 associated with the first library 10a to an external pass-through mechanism 30c. The pass-through mechanism 30c can then move the data storage cartridge via a rail or another mechanical device to a position that is proximate to (i.e., close to and/or within) a pass-through portal 120 associated with a second library 10b, wherein a robotic accessor assembly associated with the second library 10b may pick up the data storage cartridge from the pass-through portal 120 and place the data storage cartridge in a frame 11 of the second library 10b. In certain embodiments, the first and second libraries are separate and remote from each other while in alternate embodiments the first library and the second library are proximate and/or adjacent to (e.g., fits into or touch) each other.

Figure 3:
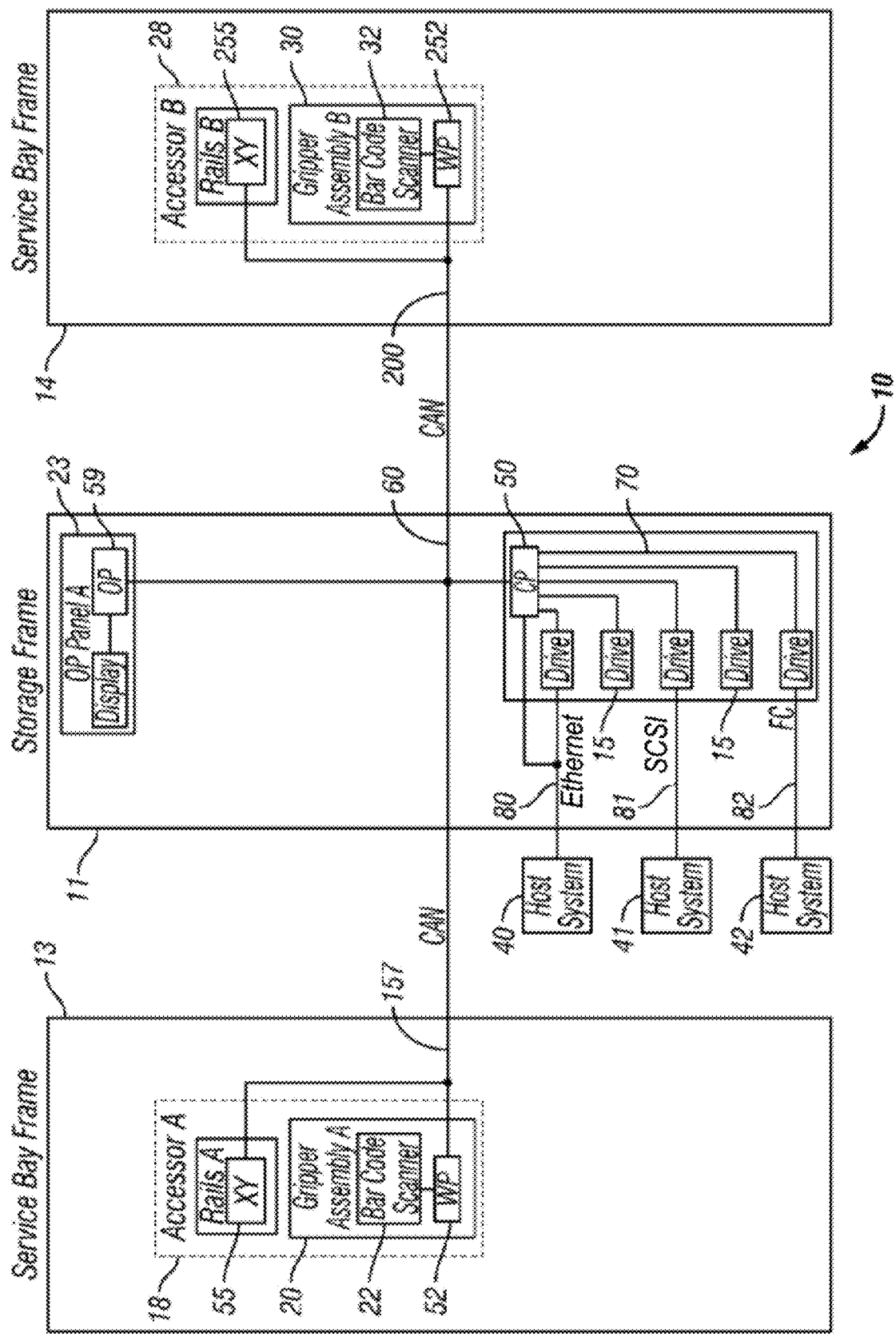
FIG. 3 is a schematic diagram of one embodiment of an automated data storage library.

Referring now to FIG. 3, the automated data storage library 10 as described in reference to FIGS. 1A & 1B, and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media. Also, an operator panel processor node 59 may be provided at the optional operator panel 23 for providing an interface for communicating between the operator panel and the communication processor node 50, the work processor nodes 52, 252, and the XY processor nodes 55, 255. Moreover, the illustrative control system may additionally include an extension network 200 that forms a network coupled to network 60 of the storage frame(s) 11 and to network 157 of left hand service bay 13 as illustrated in FIG. 3. However, as mentioned above, this is for illustrative purposes and in an alternate embodiment, network 157 may not be associated with the left hand service bay 13 and network 200 may not be associated with the right hand service bay 14. Moreover, depending on the design of the library, the data storage library may not include a left hand service bay 13 and/or a right hand service bay 14.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, the data storage drives 15 of library 10, the I/O stations 24, 25. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the data storage drives 15, via at least one external interface, e.g., coupled to line 80.

As illustrated in FIG. 3, the communication processor node 50 is coupled to each of the data storage drives 15 of a storage frame 11, via lines 70, and may communicate with the data storage drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame, although additional storage frames may be possible in different library banks or storage. According to various approaches, any of the additional storage frames 11 may include communication processor nodes 50, storage slots 16, storage slots 100, data storage drives 15, networks 60, etc. Herein, frame may refer to an expansion component of a library, an expandable library and/or a non-expandable library.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Referring again to FIGS. 1-3, according to one embodiment, the controller of automated data storage library 10 may operate the accessor(s) 18, 28 to selectively extract, place and/or transport data storage cartridges with respect to the multi-cartridge deep slot storage slots 100, the storage slots 16, the data storage drives 15 the I/O stations 24, 25, and/or other elements, components and/or assemblies of the automated data storage library 10. For example, the controller may facilitate extracting a cartridge from a multi-cartridge deep slot cell 100 or the storage slots 16, transporting the cartridge to a data storage drive 15, and placing the cartridge in the data storage drive 15. The controller may then direct the accessor to extract the cartridge from the data storage drive 15 and to transport the cartridge to a specific multi-cartridge deep slot cell 100, and place the cartridge therein. Some libraries may transport magazines, which hold two or more cartridges, for part or all of a cartridge transport. For example, a magazine may contain a desired cartridge and the magazine may be transported in an effort to transport the desired cartridge.

In one embodiment, one or more data storage cartridges may be added into the library, e.g., at an I/O station 24, 25 and/or a pass-through portal 120, whereby the controller of the automated data storage library 10 may then operate the accessor(s) 18, 28 to transport the cartridge(s) to specific multi-cartridge deep slot cell(s) 100, and/or single cartridge storage slots 16, and place the cartridge(s) therein. Similarly, the controller may operate the accessor(s) to selectively extract, data storage cartridges with respect to the single cartridge storage slots 16 and/or multi-cartridge deep slot cell(s) 100, and transport the cartridge to an I/O station 24, 25 and/or a pass-through portal 120.

Figure 4:
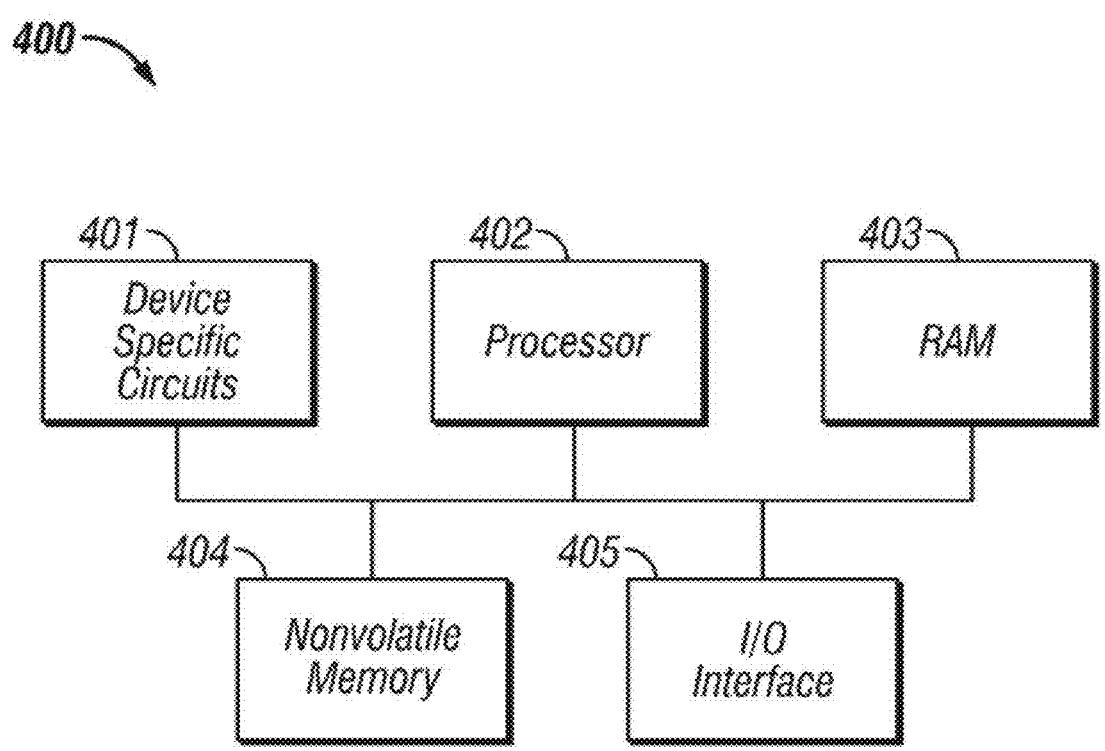
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and input output (I/O) interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), Ethernet, RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper 20. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

In a data storage system, in addition to data storage cartridges being stored inside a data storage library, a data storage cartridge can be assigned to an external location such as a vault storage (i.e., outside a data storage library) within the storage hierarchy. Under various regulatory requirements, and/or other data retention regimes customers may need to keep data for very long periods of time, in certain scenarios up to several decades. As such, a vault storage may comprise a long term storage space for storing and/or archiving large amounts of data, data storage cartridges, and/or data storage magazines in a secured and climate controlled manner. In other words, when a data storage cartridge is removed from a data storage library it is said to have been put "in the vault" external to the data storage library. Typically, data storage components (e.g. cartridges, magazines, etc.) are transferred to be stored in a vault storage when a cartridge, a magazine or a data storage library becomes full. Additionally, and/or alternatively, the vault storage may be used for storing back-up data storage cartridges, blank data storage cartridges, data storage cartridges that are not going be used for a certain period of time, obsolete data storage cartridges, data storage cartridges less likely to be requested or updated, etc. When a data storage cartridge is removed from a data storage library (e.g., via an export or output station) for storage in an external vault storage, the space made available in the library may be replaced by importing a blank and/or previously archived data storage cartridge into the data storage library (e.g., via an import or input station). As such, the I/O station of a data storage library acts as an import/export port where data storage cartridges can be transferred between an environment external to the library (such as from another library and/or a vault storage) and between an environment internal to the library. Hence, exporting a data storage cartridge from a data storage library to the vault storage may include, for example, moving the data storage cartridge from a data storage cartridge drive to an export station, moving a data storage cartridge from a slot in the data storage library to the export station, and other actions configured to remove a data storage cartridge from a data storage library. Herein, references to data storage cartridges may also refer to data storage magazines, where a magazine may contain two or more cartridges.

In one embodiment, data storage cartridges may be stored in vault storage. In one embodiment, vault storage may comprise a room where data storage cartridges are arranged along the walls, floor, ceiling, and/or on shelves or in other positions and by other means in the room. The cartridges may be arranged, for example, in storage slots, cells or magazines. The vault storage may optionally comprise a data storage library or a portion of a data storage library (e.g., a partition of a library or logical library).

Figure 5:
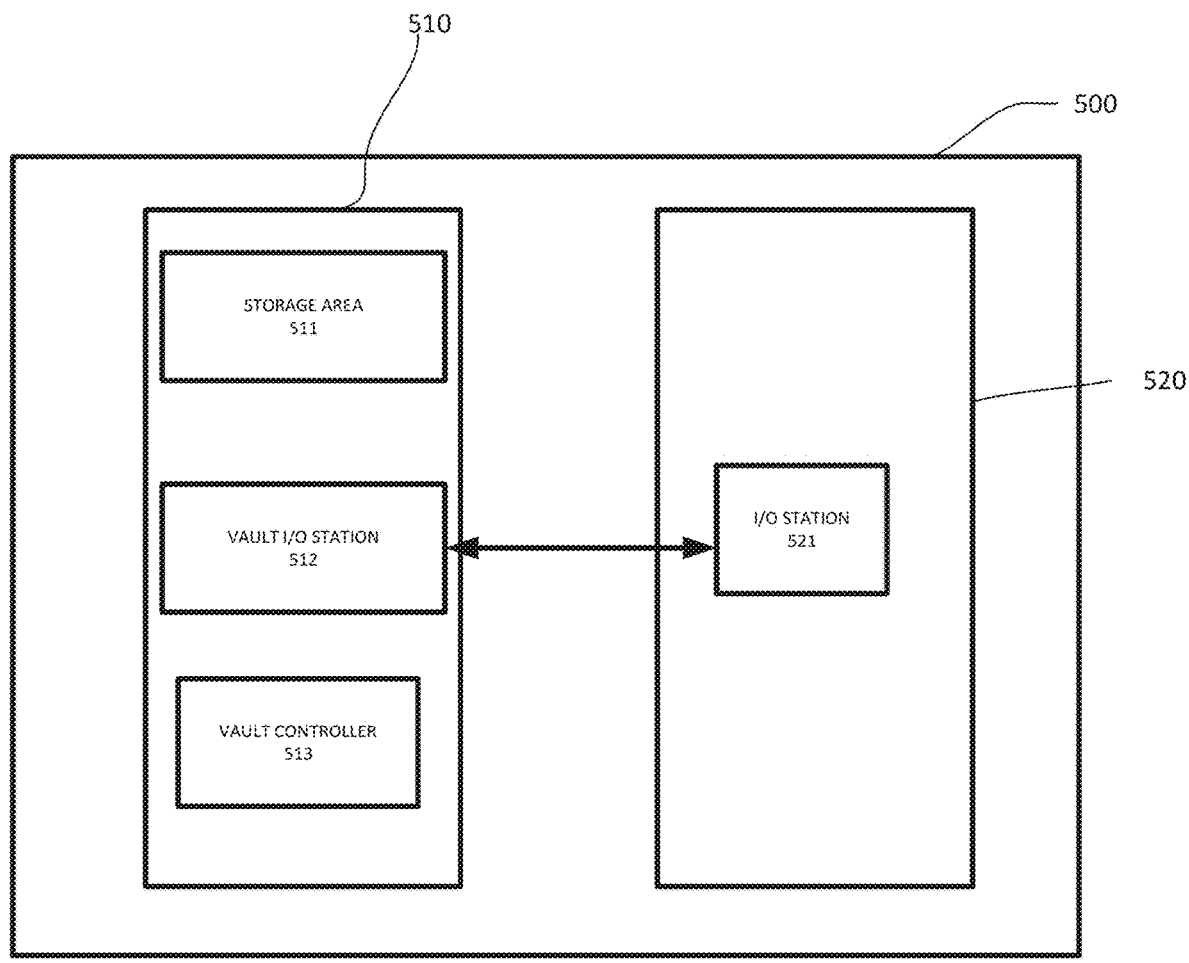
FIG. 5 depicts a block diagram of a vault storage, according to an embodiment.

FIG. 5 illustrates a schematic block diagram of an embodiment of a data storage system 500 that includes data vault storage 510 for long term storage of data storage cartridges and a data storage library 520. In an embodiment, a vault storage 510 is a storage device that includes, for example and without limitation, a storage area 511, an optional vault import/export station (vault I/O station) 512, and an optional vault controller 513. The storage area includes a plurality of storage slots (not shown here) that are used for shelving the data storage shelves for long periods of time. In an embodiment, the vault controller 513 has access to information about the storage area 511 and/or the location of data storage cartridges in the storage area 511. The term "vault controller" as used herein is intended in its broadest sense as a device that includes at least one processor, and optionally further circuitry, memory, and/or logic, for controlling and/or providing at least some aspects of the vault operations including the transfer of data storage cartridges to and/or from the vault storage area. A vault controller 513 may include internal and external hardware components, as depicted and described in further detail with respect to FIG. 4. In an embodiment, a vault controller may be and/or include a library controller and/or a data storage controller.

Generally, a human operator transfers the data storage cartridges stored in a data vault storage 510 to and/or from an I/O station 521 of the data storage library 520, directly from the storage area 511 and/or via the vault I/O station 512 (it should be noted that the data storage cartridges may be transferred from the storage area 511 to the vault I/O station 512 using robotic accessors similar to those described above with respect to a data storage library). Alternatively, and/or additionally, a robotic accessor of the data storage library 520 may move between the vault I/O station 512 of the vault storage 510 and the I/O station 521 of the data storage library 520 (e.g., bidirectionally along a rail system) to transfer data storage cartridges.

Vault storages (e.g., those associated with one or more data storage libraries) configured to store and/or archive data storage cartridges, data storage magazines, or other components in a data storage system will not be described in detail since they are known in the art in connection with data storage libraries.

It should be noted that while a conventional vault storage includes storage slots on the walls of an enclosure or housing as shown in FIG. 5, in alternate embodiments as described above, vault storage may comprise a room (without a separate dedicated enclosure) with or without a vault I/O station. For example, a vault storage may be a room with shelves configured to be storage slots on the walls, floor, roof, or any other position within the room.

Figure 6:
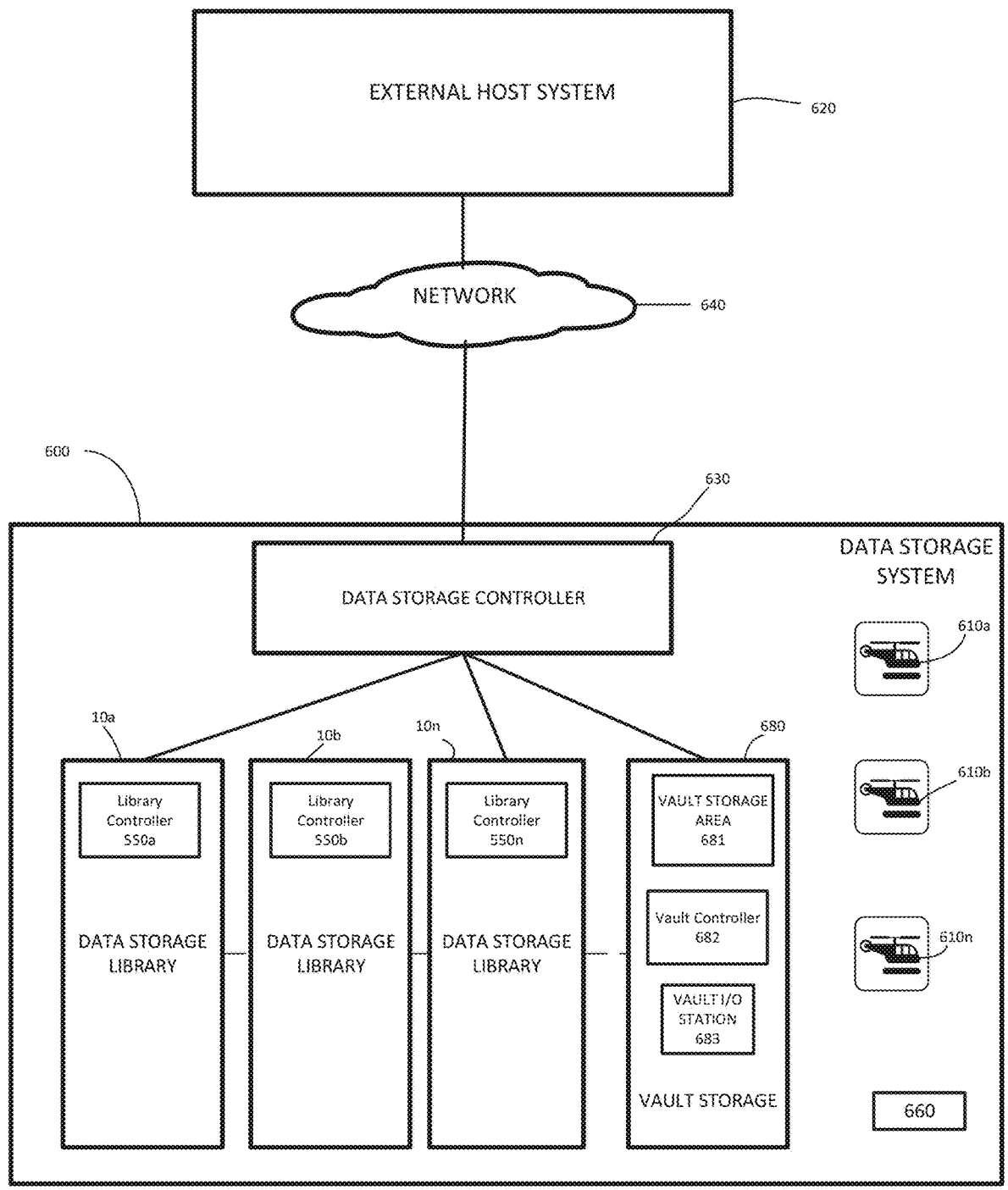
FIG. 6 is a functional block diagram illustrating a data storage system utilizing drones for transferring data storage cartridges, data storage magazines, and/or other components, according to an embodiment.

Referring now to FIG. 6, a functional block diagram illustrating a data storage system 600 that includes multiple data storage libraries 10a, 10b . . . 10n and a vault storage 680, and that utilizes one or more unmanned aerial vehicles (hereinafter "drone", "unmanned aerial vehicle" or "UAV") 610a, 610b . . . 610n for transferring data storage cartridges, data storage magazines (and/or other components) to and/or from a data storage library (e.g., I/O station, and/or pass-through portal) and/or the vault storage is shown. An unmanned aerial vehicle (UAV), commonly known as a drone, is an aircraft without a human pilot aboard. Flight of the UAV is controlled either autonomously by onboard computers or by a pilot using a remote control. The typical launch and recovery method of an unmanned aircraft is by an automatic system or an external operator.

In an embodiment, the data storage system 600 may include a plurality of data storage libraries 10a-n that are in communication with an external host system 620 over network 640, via a data storage controller 630. The data storage system 600 may also include a vault storage 680 for long-term storage of data storage cartridges. The data storage system 600 may also include a plurality of drones 610a-n configured to transfer components (e.g., data storage cartridges, data storage magazines, etc.) to and/or from multiple libraries 10a-n and/or the vault storage 680 in the data storage system 600. In an exemplary embodiment, the drones 610a-n are capable of movement in the x-, y-, and z-coordinate directions and capable of transporting components (e.g., data storage cartridges, data storage magazines, etc.) within the data storage system 600. In an embodiment, the drones 610a-n of the current system are configured to have a size and structure that enables them to handle and/or apply the forces required to retrieve, transfer, and/or place a components (e.g., data storage cartridges, data storage magazines, etc.) to and from a pass-through portal, an I/O station of a data storage library, an accessor of a data storage library, a vault storage cell, a vault I/O station, and/or a vault room. Any number of drones 610a-n may be added to, or removed from, data storage system 600 as required to support the transfer of components (e.g., data storage cartridges, data storage magazines, etc.) to and/or from the libraries and/or the vault storage. In an embodiment, the data storage controller 630 is also in communication with the one or more drones 610*a-n*. While the drones are described and depicted as transferring data storage cartridges between the data storage libraries 10*a-n* and/or the vault storage 680, it will be appreciated that the drones may be adapted and configured for transferring other components in addition to or as an alternative to data storage cartridges and data storage magazines.

As discussed above with respect to FIGS. 1-5, a data storage system typically has data storage cartridges in large arrays to store large amounts of data in one or more data storage libraries and/or a vault storage. In an embodiment, the data storage libraries 10*a-n* may comprise a single library frame 11 or may comprise multiple library frames (and service bays) connected together as rows to form data storage banks or strings. The interior of a frame of a data storage library may include an area for storing data storage cartridges (e.g., multi-cartridge deep storage cells and single cartridge storage slots, collectively referred to as "storage slots" in the subsequent disclosure), one or more data storage drives that store data to, and/or retrieve data from data storage media, and I/O stations and/or pass-through portals for transferring components (e.g., data storage cartridges, data storage magazines, etc.) to and from the data storage libraries, among other components (e.g., controllers, robotic accessors, communication cards, power supplies, etc.), which would be apparent to one skilled in the art upon reading the present description.

In an embodiment, each of the data storage libraries may also include a library controller 650*a-n*. In an exemplary embodiment, the library controllers of one or more of the data storage libraries 10*a-n* may directly communicate with an external host system 620 over network 640. In an alternate embodiment, the data storage controller 630 is in communication with an external host system 620 over network 640, where the data storage controller 630 also communicates with the library controllers. As discussed above, a library controller may control its corresponding library by receiving the logical commands from hosts (directly and/or via a data storage controller), determining the required actions, and/or converting the actions to physical movements of the robotic accessor(s) of the library.

Further, as discussed above with respect to FIG. 5, in an embodiment, a vault storage 680 may comprise a storage area 681 for storing data storage cartridges (e.g., in vault storage cells), a vault controller 682 for controlling the operations of a vault storage, and a vault I/O station 683 for transferring components (e.g., data storage cartridges, data storage magazines, etc.) to and from the vault storage, among other components, which would be apparent to one skilled in the art upon reading the present description. Alternatively, and/or additionally, vault storage 680 may comprise a room (without a separate dedicated enclosure) for storing data storage cartridges ("vault room") with or without a vault I/O station. In an exemplary embodiment, the vault controller 682 may directly communicate with an external host system 620 over network 640. In an alternate embodiment, the data storage controller 630 is in communication with an external host system 620 over network 640, where the data storage controller 630 also communicates with the vault controller 682. As discussed above, a library controller may control operations within the vault storage by receiving the logical commands from hosts (directly and/or via a data storage controller) and determining the required actions (e.g., determining the location of a data storage cartridge in the storage area 681 and/or causing the transfer of data storage cartridges from the data storage area 681 to and/or from the vault I/O station 683). It will be appreciated that a data storage system may include one or more vault storages.

Thus, looking to various embodiments presented herein, transfer of components (e.g., data storage cartridges, data storage magazines, etc.) to and/or from the libraries and/or the vault storage may include the ability to remove a component (e.g., data storage cartridge, data storage magazines, etc.) from a pass-through portal of a data storage library, an I/O station of a data storage library, an accessor of a data storage library, a storage cell of a vault storage, a vault I/O station, an accessor of a vault storage, and/or a vault room, and combinations thereof and/or the ability to place a component (e.g., data storage cartridge, data storage magazines, etc.) into a pass-through portal of a data storage library, an I/O station of a data storage library, an accessor of a data storage library, a storage cell of a vault storage ("vault storage cell"), a vault I/O station, and/or a vault room, and combinations thereof.

As discussed above, the data storage system 600 may include one or more drones 610*a-n* to transfer components (e.g., data storage cartridges, data storage magazines, etc.) to and/or from the libraries 10*a-n* and/or the vault storage 680. The drones and associated docking stations and aids may be in addition to, to work in association with, as a redundant system, as an alternate to, or a replacement of the robotic accessors and/or pass-through mechanisms that transfer components (e.g., data storage cartridges, data storage magazines, etc.) between data storage libraries and/or between data storage libraries and a vault storage, as discussed above. It should be noted that the components (e.g., data storage cartridges, data storage magazines, etc.) may be transferred from a storage slot and/or a data storage drive of a data storage library to an I/O station and/or a pass-through portal of a data storage library using the robotic accessors described above. Since the drones 610*a-n* are capable of movement in the x-, y-, and z-coordinate directions. The drones 610*a-n*, as they are not attached to or riding on any track or mechanism, may move in any direction and/or by any route to transfer components (e.g., data storage cartridges, data storage magazines, etc.) to and/or from the libraries 10*a-n* and/or the vault storage 680. The drones 610*a-n* may share the entire space of a data storage system so that a drone could access any data storage cartridge in or at the pass-through portal of a data storage library, an I/O station of a data storage library, an accessor of a data storage library, a vault storage cell, a vault I/O station, and/or a vault room.

In an embodiment, each of the data storage libraries 10*a-n* and/or the vault storage 680 may include at least one drone docking station to which a drone may selectively land on or attach to (dock) and take-off or detach (undock). The docking station may be integral with a housing enclosure or frame structure of the libraries 10*a-n* and/or the vault storage structure, or associated with a separate structure in the data storage system 600 (e.g., service bay frame of a data storage library). In an exemplary embodiment, the drone docking station may be relatively close to where a data storage cartridge is to be retrieved or dropped off. For example, the drone docking station may be close to, adjacent to and/or associated with a pass-through portal of a data storage library, an I/O station of a data storage library, an accessor of a data storage library, a vault storage cell, a vault I/O station, and/or a vault room. In an embodiment, the placement and layout of the docking stations in the data storage system 600 may be configured such that all the pass-through portals, I/O stations in the data storage system 600, as well as the vault storage cells and/or the vault I/O station, are accessible by a drone by associating with one or more of the docking stations. In one embodiment, each pass-through portal, I/O station, accessor, vault storage cell, vault I/O station, and/or vault room in the data storage system 600 may have and/or be associated with a drone docking station.

Docking at a docking station at a source or a destination location allows the drone to rest from flight, thereby conserving energy while it performs component (e.g., data storage cartridge, data storage magazine, etc.) retrieval and placement operations. In addition, docking at a docking station allows the drone to have a stable and/or rigid base to facilitate the forces required to pick up and/or place data storage cartridges as well as maintain relatively tight tolerances generally desirable during data storage cartridge retrieval and/or placement operations. Docking at a docking station may also allow the drone to connect to a power source where the drone may charge and/or utilize power directly from a data storage library and/or vault storage to pick and place data storage cartridges, data storage magazines, etc. and/or recharge itself. For example, while at the docking station, the drone may connect to the source or destination library (and/or vault storage) to supply power directly to a gripper mechanism to move, manipulate, and transfer the components (e.g., data storage cartridges, data storage magazines, etc.) to and/or from the drone. The power connection may also provide a communication link between the drone and one or more (e.g., at least one) library controllers and/or the vault controller, by modulating, for example, the power bus with a communication signal. Alternatively, and/or additionally, the drone may connect to a dedicated communication bus when it is docked at a docking station. Alternatively, and/or additionally, the drones may use wireless communication to communicate with the one or more library controllers, with other components of the data storage system such as the data storage controller or the vault controller, and/or with each other as discussed below in more detail.

In one embodiment, a docking station may be configured to, for example, stabilize the drone, enable a drone to recharge/refuel, provide an electrical coupling between the drone and the data storage library (e.g., to enable the drone to communicate with a library controller), reset navigation systems, and await further instructions, or a combination thereof. One or more components (e.g., a gripper assembly) in the docking station may also be configured to drop off or pick up components (e.g., data storage cartridges, data storage magazines, etc.), for example, from a pass-through portal of a data storage library, an I/O station of a data storage library, an accessor of a data storage library, a vault storage cell, a vault I/O station, a vault room, and/or drones.

Figure 7:
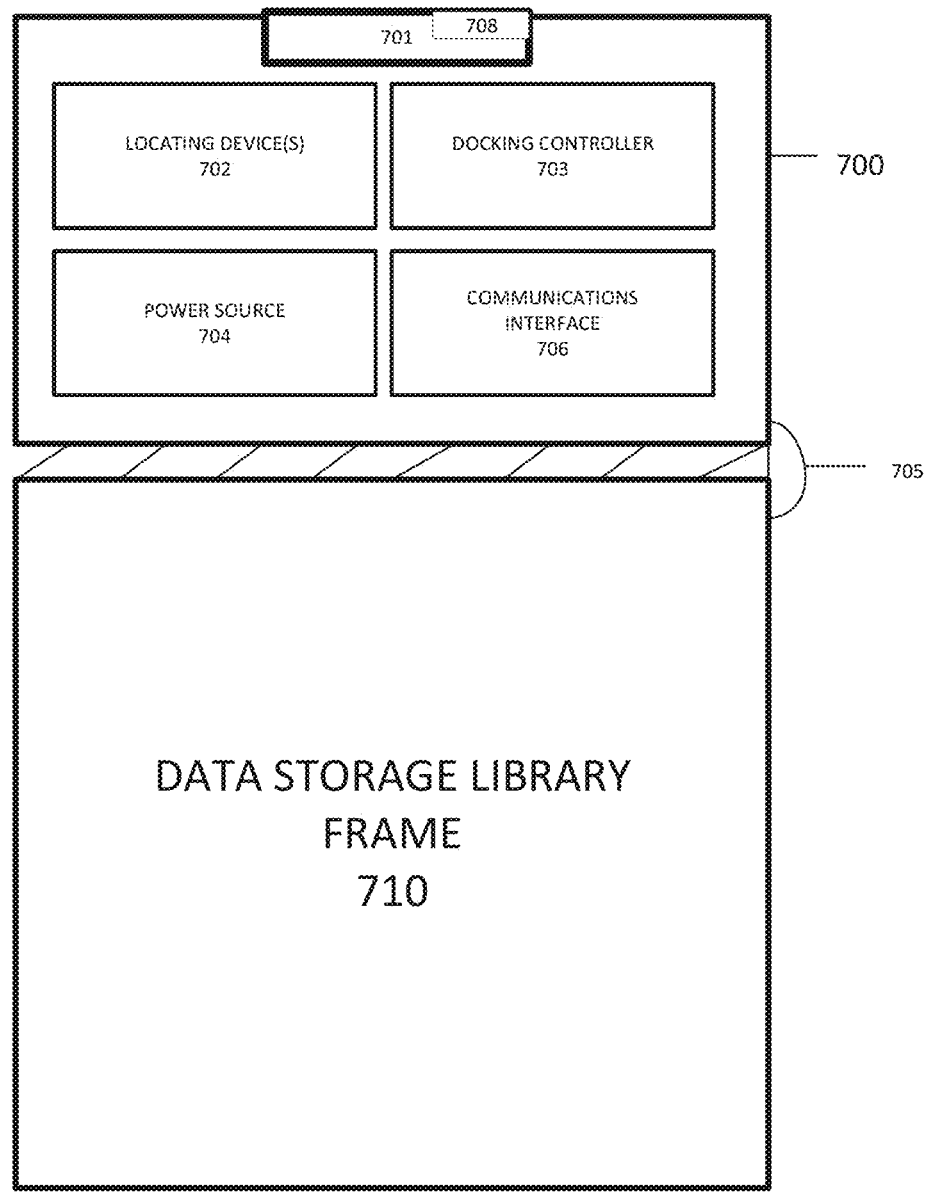
FIG. 7 depicts a block diagram of a docking station associated with a library, according to an embodiment.

FIG. 7 illustrates a schematic diagram of a drone docking station 700 associated with and/or attached to a library frame 710, according to one embodiment. As shown in FIG. 7, an exemplary drone docking station 700 may optionally include, without limitation, one or more docking structures 701, one or more locating devices 702, a docking controller 703, a power source 704 (e.g., recharge and/or refuel), a coupling interface 705, and a communications interface 706. Docking station 710 may include more and/or less components, and one or more of the identified components (e.g., docking structures 701, locating devices 702, docking controller 703, power source 704, coupling interface 705, and communications interface 706) may exist individually and/or be combined with and share parts, functionality, structure, and/or circuitry with other identified components. It will be appreciated that the drone docking station 700 of FIG. 7 may similarly be associated with and/or attached to a vault storage structure.

In an embodiment, a docking structure 701 may include a platform, housing, or other similar structure for storing, docking, and/or launching drones. The docking structure 701 preferably stabilizes the drone, permits the drone to rest from flight, and/or provides a base to facilitate the forces required to transfer components (e.g., data storage cartridges, data storage magazines, etc.) to and/or from the drone. The docking structure also preferably maintains the tolerances desired when transferring components to and/or from the drone to other components (e.g., pass-through portals, I/O stations, accessors, vault storage cells, vault I/O station, and/or vault room) of the data storage system. The docking structure 701 may also include one or more docking aids 708 configured to receive and/or engage one or more landing structures associated with a drone (discussed below) and may assist in securing the drone to the docking station 700 such that a stable connection or attachment can be made to the docking station. Examples of docking aids 708 may include, without limitation, slots, brackets, wedges, tethers, channels, grooves, recesses, latches, magnetic docking aids configured to exert an electromagnetic field, hooks, or the like, configured to stabilize the drone, for example, by engaging complementary landing structures of a drone. In an embodiment, one or more of the docking aids 708 may only be deployed when a drone is approaching and/or is attached to the docking station, and may be withdrawn in a receiving area of the docking structure 701 when the docking aid 708 is not deployed. Herein, landing structure and docking structure refer to structures, features, assemblies, etc. that allow a drone to come to rest for the purpose of charging, refueling, and/or transferring a component to/from the drone.

In an embodiment, a locating device 702 may assist and facilitate with accurately guiding and docking a drone to a docking station and/or docking structure (e.g., a docking aid). For example, the locating devices 702 may include an optical feature such as a visible landing target, sensors (e.g., pressure sensors), laser scanners, video cameras, or the like to guide the drone to a precise location during a landing or docking sequence, and a drone may use a complementary sensor and/or feature to more precisely guide the landing and/or positioning of the drone. The locating devices 702 may include optical locating devices, radio locating devices or a combination thereof. In some embodiments, the locating devices 702 may be emitters only, or may be a combination of shapes, emitters, receivers, transmitters, transceivers, and sensors. In some embodiments, each of the locating devices 702 may have an optical zone that emits an optical signal such as a directional or non-directional infrared beacon. Further, each of the locating devices 702 may have a radio signal, such as a directional or non-directional radio beacon or signal. The optical signal and the radio signal may be unidirectional or bi-directional. When the optical signals are bi-directional, the optical signal and the radio signal may function as sensing signals. Further, the optical signal and the radio signal may function as communication links. A drone 610 using landing sensors (discussed below) may couple to the locating devices 702 such that a guided landing is facilitated. For example, the drone may obtain position and ranging information from the locating devices 702 which may inform the drone of its proximity with the docking station, a rate of descent, a relative position with respect to the docking station, or other information.

In an embodiment, docking station 700 may include a docking controller 703 to direct the operations of the docking station, a data storage library, a vault storage, and/or a drone attached to the docking station. The term "docking controller" as used herein is intended in its broadest sense as a device that includes at least one processor, and optionally further circuitry, memory, and/or logic, for controlling and/or providing at least some aspects of the docking station operations. The docking controller 703 may be in communication with one or more library controllers, a vault controller, a data storage controller, and/or a drone control unit. For example, in an embodiment, the docking controller 703 may coordinate with a library controller to cause an accessor associated with a library to move a data storage cartridge from its location (e.g., storage slot and/or data storage drive) to a pass-through portal and/or I/O station of the library in response to a drone docking to (and/or approaching) the drone docking station (discussed below). In another example, a library controller and/or data storage controller may communicate with the docking controller 703 to provide notification of a request for transfer and/or movement of a data storage cartridge, and the docking controller 703 may determine the required actions (e.g., deployment of docking aids), and/or converting the actions to physical movements of the docking station. A docking controller 703 may also communicate with a drone to obtain information such as time of arrival, route information, power status, or the like, and control various operations of the docking station based on the received information. In yet another example, a docking controller 703 may be in communication with a vault controller to obtain information such as the location of a data storage cartridge in the vault storage. For example, a docking controller 703 may also provide guidance information to a drone, for example, through a GPS waypoint, with a known coordinate (e.g., latitude and/or longitude), or by operating one or more of the docking aids 708 and/or locating devices 702. In another exemplary embodiment, a docking controller 703 may operate a power source 704 of the docking station 700 to recharge and/or a refuel a drone based on the battery status and/or fuel status of the drone. A docking controller 703 may include internal and external hardware components, as depicted and described in further detail with respect to FIG. 4. In an embodiment, a library controller may be and/or include a docking controller.

In an embodiment, docking station 700 may include a coupling interface 705 (e.g., for providing an electrical interface, a communications link, etc.) that interfaces with and/or physically connects with the data storage library frame 710 to operably couple the docking station 700 and the data storage library frame 710. For example, coupling interface 705 of docking station 700 may be a male receptacle connector, which mates with and receives a female pin connector of the library frame 710, or vice versa. In an alternate embodiment, the coupling interface 705 of the docking station 700 may be wirelessly coupled to the data storage library frame 710. In an embodiment, the coupling interface may be configured to provide an electrical interface between the docking station 700 and the library frame 710 such that the docking station 700 and the library frame 710 are directly electrically coupled and may provide a power link between the docking station and the data storage library. In an embodiment, the coupling interface 705 may also be configured to permit communication (e.g. a communications link) between the docking station 700 and the data storage library e.g., a library controller.

In an embodiment, the docking station 700 may also include a communication interface 706 configured to permit communications between the docking station 700 and one or more components of the data storage system such as the library controller(s), a vault controller, a drone, and/or a data storage controller. The communications interface may include a wired and/or a wireless communications link. In one embodiment, the drone has a communications connector that interfaces with and/or physically connects and makes contact with a communications connector on the docking station 700.

In an embodiment, the drone docking station 700 may also include a power source 704 to recharge, refuel and/or swap the energy storage and/or cell on the drone. The energy storage of the drone may be a battery such as, for example, a super capacitor, lithium ion cell, fuel cell or another power source. The energy storage may be recharged using direct or inductive charging from a power source 704 of a docking station. In an embodiment, the power source 704 of a drone docking station 700 may receive power from an associated frame and/or service bay of a data storage library. The power source may also power the docking controller 703, the locating device 702, the coupling interface 705, the communications interface 706, and/or other components of the docking station 700. The power source 704 may also directly power the drone 510, its controllers, and/or mechanisms/accessors to move and manipulate components (e.g., data storage cartridges, data storage magazines, etc.). In an embodiment, the power source may be a light source and the drone may contain solar cells for converting the light to electricity.

It should be appreciated that one or more of the docking structures 701, docking aids 708, locating devices 702, docking controller 703, power source 704, and or communications interface may be omitted or combined. For example, docking aid 708, power source 704 and communications interface 706 may be combined as a connector that provides the functionality of the docking aid 708, the power source 704 and the communications interface 706.

Figure 8:
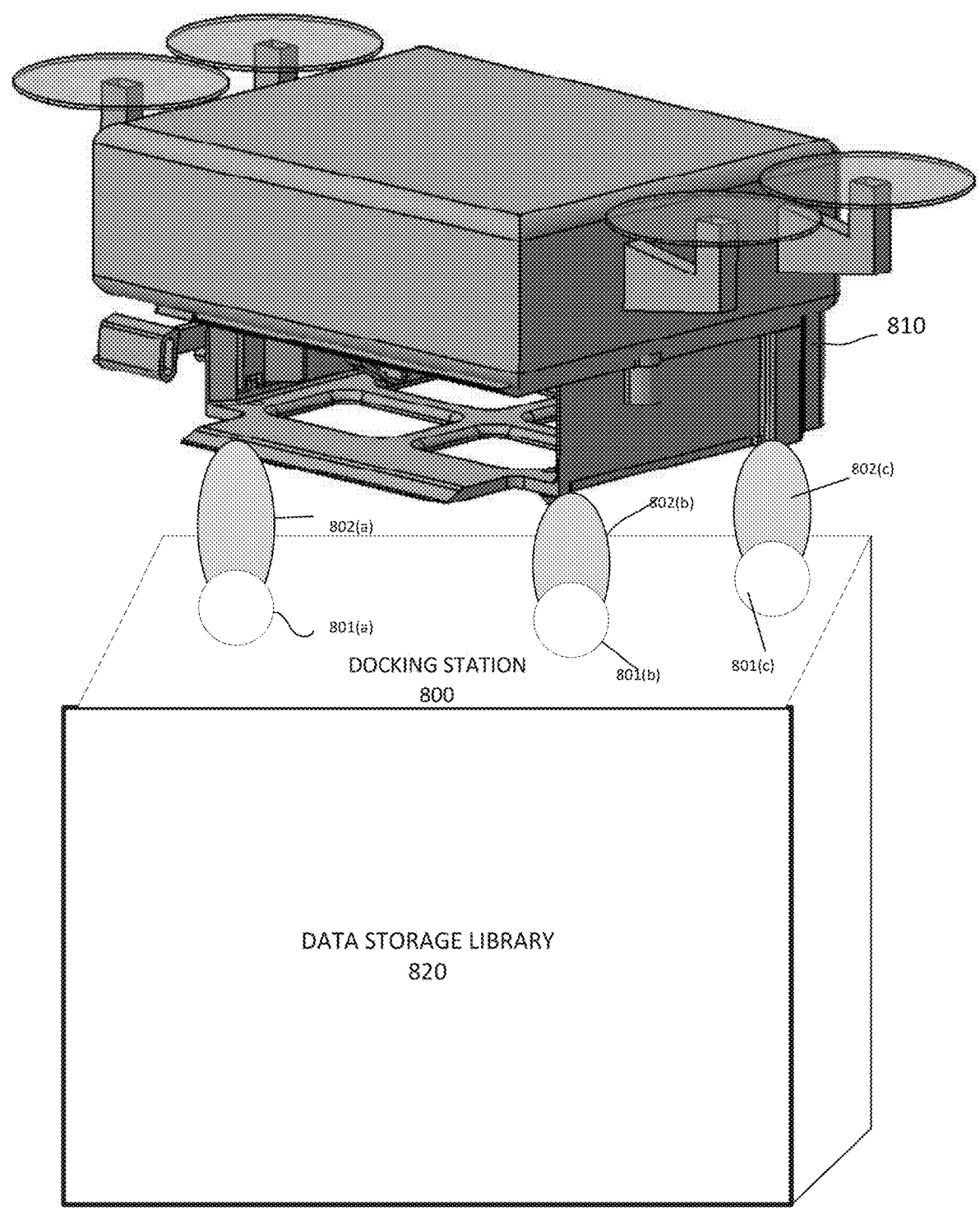
FIG. 8 depicts a schematic representation of various components of a drone, according to an embodiment.

FIG. 8 shows an exemplary drone docking station 800 associated with a data storage library 820 according to an embodiment. The docking station 800 includes a docking structure 801 that has docking aids, e.g., slots 801(a), 801(b) and 801(c) for engaging complementary docking pins 802(a), 802(b) and 802(c) of a drone 810. The slots 801 and pins 802 engage each other in a manner that stabilizes the drone 810. The docking structure 801 in one embodiment may be sufficient to keep the drone stationary and/or permit the drone flight assembly to be powered down and rest from flight and/or be at a lower power level so as to conserve energy while it transfers components (e.g., data storage cartridges, data storage magazines, etc.). The docking structure 801 and complementary docking pins may also stabilize the drone 810 such that sufficient forces can be applied by the drone 810 to load and unload the components (e.g., data storage cartridges, data storage magazines, etc.) from the drones. The docking slots 801 and complementary pins 802 preferably sufficiently stabilize the drone to permit transfer of components between the drone and the data storage library while maintaining the required tolerances to the make the transfer. While the docking structure 801 of the docking station 800 in this embodiment is shown and described as slots 801 in the library frame that engage complementary pins 802 on the drone 810, it will be appreciated that the library frame may have pins, latches, and/or other structures, while the drone may have complementary slots. Other structures and mechanisms are contemplated for docking structure 801 to assist, facilitate, attach and/or dock the drone 810 to the library 820.

The docking structure 801, and one or more of the slots 801(a) and 801(b) illustrated in FIG. 8, may optionally further be configured, arranged, and/or structured to include and/or be associated with one or more of power source, communications interface, and/or locating devices. For example, the slots and/or other docking structure 801 may make contact with one or more nodes that may provide power and/or communication links between the data storage library 820 and the drone 810. In addition, while drone docking station 800 is shown as being associated with a library frame, it will be appreciated that the drone docking station 800 may be associated with and/or integrated with a vault storage structure and/or frame.

In an embodiment, drones 610a-n may take on many different configurations and may include any type of transport configuration and/or arrangement configured to fly. In an exemplary embodiment, a drone may include a flight assembly which may include one or more or any combination of propellers, rotors, blades, etc. ("flight assembly") that generate a lifting force sufficient to lift the drone (including the drone structure, motors, electronics, and power source) and any loads (e.g., data storage cartridges, data storage magazines, etc.) that may be attached to the drone. The flight assembly may also provide a horizontal propulsion force so that the drone may move in any of the x-, y-, and z-coordinate directions and may move in any desired direction, and/or by any desired route. The flight assembly, including any motors, actuators, propellers, rotors, and/or propulsion assemblies, may be powered by a power source, such as an energy storage system like a battery and/or a super capacitor. The flight assembly may be vertically and/or horizontally mounted depending on the flight mode of the drone.

One preferred flight assembly may include a plurality of electric motors powering a plurality of propellers or rotos. Each propeller may be associated with and/or connected to an electric motor. Several motors (e.g., servo motors) may act to move the motor/propeller assembly to provide the correct amount of angular rotation to provide desired vertical lift and horizontal propulsion. A common drone configuration suitable for use in the various embodiments is a "quad-copter" configuration. In an example of a quad-copter configuration, typically four horizontally configured rotary lift propellers and motors are fixed to a frame. Drones configured with more or less propellers and/or motors are also contemplated. The frame may include structures that support the flight assembly, power source (e.g., battery), package securing mechanism, docking and landing structure (e.g., landing gear), and so on. The package securing and/or holding mechanism of a drone may include a gripper assembly for attaching to one or more components (e.g., data storage cartridges, data storage magazines, etc.). Additionally, and/or alternatively, an area enclosed by the frame and landing gear, and underneath the flight assemblies or propulsion units (e.g., a holding structure), may be provided as shown in FIG. 8 to retain components such as, for example, a data storage cartridges and/or data storage magazines. A quad-copter style horizontal rotary drone may fly in any unobstructed horizontal and vertical direction or may hover in one place. In the examples described herein, a quad-copter drone configuration is used for illustrative purposes, however, other drone designs are contemplated and may be used.

Figure 9:
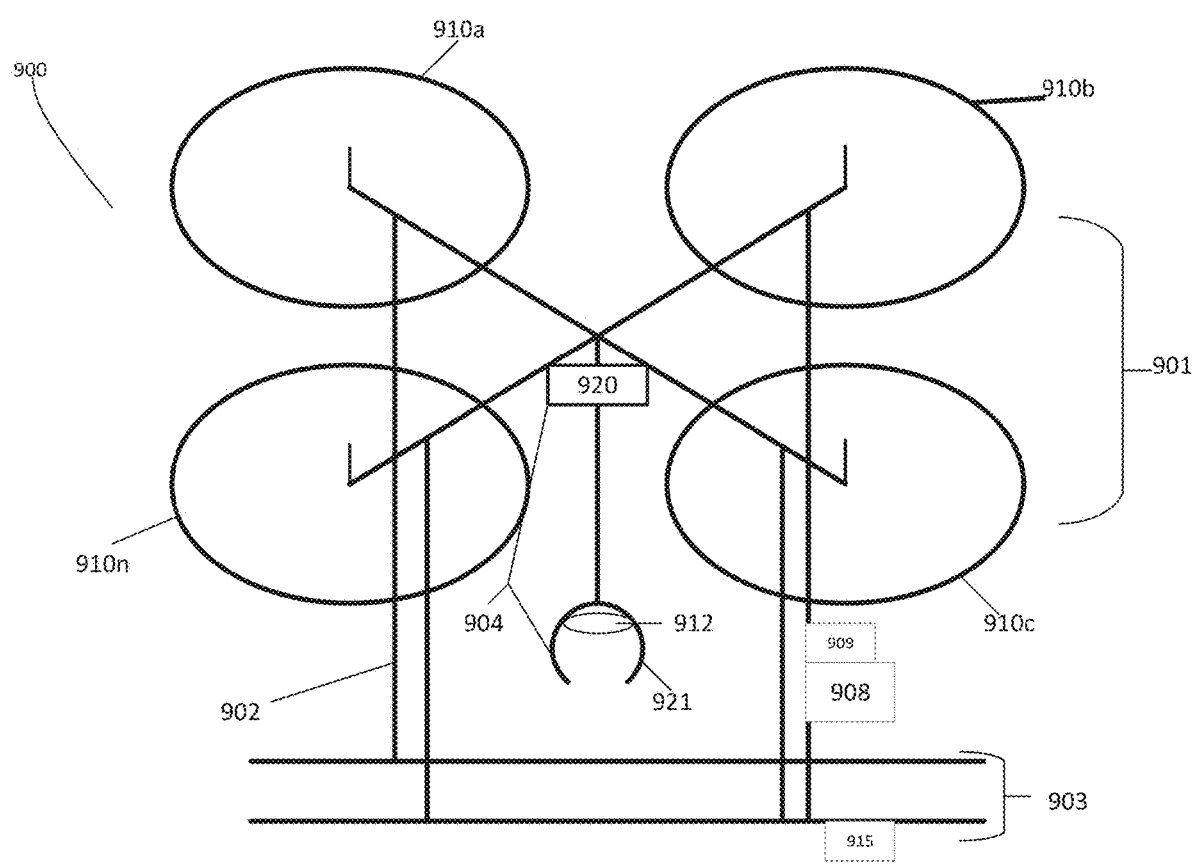
FIG. 9 illustrates a drone in the process of docking to a data storage library, according to an embodiment.

An exemplary drone 900 configured to transport components (e.g., data storage cartridges, data storage magazines, etc.) to and/or from data storage libraries 10a-n and/or vault storage 680 in the data storage system 600 according to various embodiments is schematically illustrated in FIG. 9. In an exemplary embodiment, the drone 900 may include a flight assembly 901, a frame 902, landing structures 903, a package securing and/or holding mechanism (e.g., gripper assembly, or holding cell) 904, a power source (not shown here), and a control unit 908. The flight assembly 901 may include rotors 910a, 910b, 910c . . . 910n, and one or more associated motors (not shown here). For ease of description and illustration, some detailed aspects of the drone 900 are omitted such as wiring, skin or shell, frame structure interconnects or other features that would be known to one of skill in the art.

In an embodiment, the frame 902 may provide structural support for the flight assembly 901, the landing structures 903, and the package securing and/or holding assembly 904, and is configured to be sufficiently strong to support the maximum load weight for the combination of the components of the drone and the drone's expected load (e.g., a data storage cartridge, data storage magazine, etc.).

In an embodiment, the package holding and/or securing assembly 904 may include one or more structure(s) configured to hold, retrieve and/or place a component (e.g., a data storage cartridge, data storage magazine, etc.) to and/or from pass-through portals of a data storage library, I/O stations of a data storage library, an accessor of a data storage library, vault storage cells, vault I/O station, and/or vault room in a data storage system, and hold the data storage cartridge during transfer. In an exemplary embodiment, the package holding and/or securing assembly 904 may include, without limitation, a gripper assembly 921 and/or a holding structure 920. In some embodiments, the gripper assembly 921 may be configured to retrieve and/or place a component (e.g., data storage cartridge, data storage magazine, etc.) to and/or from pass-through portals of a data storage library, I/O stations of a data storage library, an accessor of a data storage library, vault storage cells, vault I/O station, and/or vault room in a data storage system, as well as grip and/or hold the component (e.g., data storage cartridge, data storage magazine, etc.) during transfer. In an alternate embodiment, a drone may utilize the holding structure 920 for securely holding a data storage cartridge during transfer and the gripper assembly 921 may place and/or retrieve a data storage cartridge into and/or from the holding structure 920. In yet another embodiment, there may not be a gripper assembly 921 and a robotic accessor or another mechanism included in the library and/or the vault storage may place a data storage cartridge in the gripper assembly 921 and/or the holding slot 920 of the drone 900. In an embodiment, the size and configuration of the gripper assembly 921 may be extendible or adjustable in order to provide adequate access to pass-through portals of a data storage library, I/O stations of a data storage library, an accessor of a data storage library, vault storage cells, vault I/O station, and/or vault room from a docking station.

In an embodiment, a gripper assembly 921 of the package holding and/or securing assembly 904 may retrieve, grip and/or release components (e.g., data storage cartridges, data storage magazines, etc.) to and/or from pass-through portals of a data storage library, I/O stations of a data storage library, an accessor of a data storage library, vault storage cells, vault I/O station, and/or vault room in the data storage system. A gripper assembly 921 may include an actuator, solenoid and/or motor that drives a gripping and release mechanism to retrieve, grip and/or release a data storage cartridge or other components in response to commands from a control unit or in response to a docking operation, or the like. For example, the docking controller 703 and/or the control unit 908 of the drone may operate the actuator motor to control the gripping and release mechanism of the gripper assembly 921. Gripper assemblies (e.g., those associated with a robotic accessor) configured to retrieve, grip, and/or release a data storage cartridge or other components in a data storage system will not be described in detail since they are known in the art in connection with robotic accessors.

In an embodiment, a holding structure 920 of the package holding and/or securing assembly 904 may be configured to securely hold and/or store data storage cartridges, data storage magazines, and/or other components during transfer. Examples of holding areas may include, without limitation, storage slots, as shown in FIG. 8, configured to hold one or more data storage cartridges; magnetic or electrical holding structures; or the like. In an embodiment, when the holding structure 920 is configured to hold and/or store one or more storage cartridges, the drone may function as an I/O station magazine, where a magazine is a structure or an assembly that holds more than one data storage cartridge, such that when the structure or assembly is removed from an I/O station, one or more cartridges may be moved and/or transferred with it. Alternatively, and/or additionally, in one example, the holding structure 920 of a drone may include a component retaining mechanism that may be operated to release and/or hold a data storage cartridge in response to commands from a control unit, in response to a docking operation, via a force exerted by a library accessor, or the like. For example, the retaining mechanism may be a clamping force or a friction based mechanism that may be released upon application of a suitable force by a library accessor. In another example, the holding mechanism may be a latch that may be operated in response to a docking action via instructions from a docking controller or an automatic mechanical operation (e.g., engagement or disengagement of landing structures of a drone at a docking station may cause movement of the latch).

In an embodiment, a docking/landing structure 903 may be configured to assist the drone 900 in attaching to, engaging, and/or being associated with a docking structure 701 (e.g., 801 of FIG. 8) of a docking station. Examples of the docking/landing structure 903 may include, without limitation, docking pins, skids, slides, sledges, tethers, airframes, wheels, latches, grooves, recesses, channels, pins, or the like. In an embodiment, the docking/landing structures 903 may also include landing sensors 915 such as, for example and without limitation, optical sensors, radio sensors, proximity sensors, magnetic sensors, camera sensors, acceleration sensors, or other sensors. Alternatively, and/or additionally, the landing sensors may be contact or pressure sensors that may provide a signal that indicates when the drone 900 has made contact with a surface such as a docking station. In some embodiments, the docking/landing structure 903 may also be configured to include a coupling interface (e.g., a coupling interface that electrically couples with the coupling interface 705 described above with respect to FIG. 7) to provide the ability to charge a drone power source (e.g., battery) when the drone 900 is docked on and/or associated with a docking station, such as through charging connectors or power lines. The coupling interface may also provide direct power to the drone (e.g., the gripper assembly 921) when the drone 900 is docked at the docking station. Additionally, the landing structure 903 may provide additional connections with a docking station, such as wired communication or control connections. As shown in FIG. 8, the landing structures (i.e., docking pins 802(*a*) and 802(*b*) in FIG. 8) are configured to allow docking of a drone. Other embodiments for docking/landing structures 802 are contemplated and within the scope of this disclosure.

The drone 900 may further include a control unit 908 that may house various circuits and devices used to power and control the operation of the drone 900. In an embodiment, the control unit as used herein is intended in its broadest sense as a device that includes at least one processor, and optionally further circuitry, memory and/or logic, for controlling the drone 900 and drone subsystems. A typical control unit is described above with respect to FIG. 4. In an embodiment, the control unit 908 of a drone 900 may be configured with processing and communication devices that enable the device to, for example, determine a flight plan, navigate (such as by controlling the flight motors to achieve flight directionality), and receive position information and other information from other system components including an external host system, data storage controller, a vault controller, and/or the library controller. Position information may include the current drone position and/or positional information obtained regarding source or destination libraries, charging stations, docking stations, etc.

In an embodiment, a drone may also include various sensors, for example vision systems, proximity sensors, light detection and ranging ("LIDAR") sensors, etc. for detecting obstructions, navigation, communication with other devices, or the like. In an embodiment, when a drone is following a flight plan, it may utilize various sensors to detect local obstacles and avoid collision and then return to the flight plan. For example, the drone may have a vision system to see obstacles or laser and/or sonic range finders to determine a distance to obstacles. For example, a drone may have a laser-based scanning system that detects objects (such as other drones in the data storage system) and their distance and velocity so the drone may determine a path to avoid such obstacles.

In an embodiment, a drone may utilize fine-grain communication, for example using multilateration or triangulation of short range wireless transmitters, magnetometers, laser guides or LIDAR technologies, radar guidance, ultrasonic sensors, global positioning systems (GPS), global navigation satellite system (GNSS), or any other devices configured to provide relative or global positioning feedback such that the drone can approach, land on or in, attach, dock, or become associated with a docking station or other location in the data storage library. Alternatively, and/or in addition, the drone may be equipped to navigate by receiving beacon signals, radio frequency identification (RFID) signals, position references, or other signals from radio nodes, such as WiFi access points. Furthermore, the drone may have a sensor to measure altitude (e.g., a pressure sensor). A drone may utilize any now or hereafter known sensors, guidance, and/or positioning systems.

In one embodiment, the system and/or drones may be programmed to navigate the data storage system in a predetermined path, and the pathways may be programmed to avoid collisions. For example, the drones may be configured to navigate in a horizontal path in a first direction along the floor of the data storage system, and navigate in a horizontal path in the opposite direction along the roof of the data storage system.

A drone may also include a communications interface 909 configured to communicate with the external host system, the data storage controller, docking stations, other drones, vault controller, and/or the library controllers over a network such as via a fine-grain (e.g., wireless) communication or coarse-grain (e.g., cellular) communication. In an embodiment, the communications interface 909 may be part of or associated with the control unit 908. Control unit 908 of drone 900 in an embodiment may receive a request for transferring a data storage cartridge from the external host system, the data storage controller, the vault controller, and/or the library controller, and may control the transfer of the data storage cartridge by controlling the movement of the drone.

In an embodiment, a drone 900 may also include a scanner module 912 shown schematically in FIG. 9 configured to receive identification and/or other information (e.g., by scanning identifying labels) from a data storage cartridge, data storage magazine, and/or other components. Examples of a scanner module may include, without limitation, RFID scanner, a smart card reader, quick response codes scanner, bar code scanners, laser scanners, electrical/optical equipment with recognition software, infrared scanners, radar, sonar, chemical sensors, or an audio/visual device with recognition software. Such scanner modules are known in the art to identify, track, and locate stored items by, for example, attaching, spatial and identification information such as information encoded in RFID tags, barcode, etc. on the data storage cartridges, data storage magazines, and/or other components. In an embodiment, the scanner module 912 may be included in the gripper assembly 921.

Referring back to FIG. 6, external host system 620 may be a computing device, such as a laptop computer, a tablet computer, a netbook computer, a personal computer (PC), a desktop computer, workstation, server, a personal digital assistant (PDA), a smart phone, a thin client, or any programmable electronic device capable of communicating with the library controllers 650*a-n*, the vault controller 682, and/or data storage controller 630 via network 640. In an embodiment, the external host system 640 may also communicate with one or more drones 610*a-n* of the data storage system 600. In other embodiments, external host system 620 may be a management server, a web server, or any other electronic device or computing system capable of receiving and sending data. External host system 620 may include internal and external hardware components, as depicted and described above in further detail with respect to FIG. 4.

In an embodiment, network 640 can be, for example, a SCSI (Small Computer Systems Interface) bus, a Fibre Channel Arbitrated Loop, a local area network (LAN), a wide area network (WAN) such as the Internet, a virtual private network (VPN), a storage area network (SAN), a direct (point-to-point) connection, or a combination thereof, and can include wired, wireless, or fiber optic connections. In general, network 640 can be any combination of connections and protocols that will support communication between external host 620 and various components of the data storage system.

In an embodiment, a data storage controller 630 is configured to be in communication with an external host system 620, one or more library controllers 650*a-n*, the vault controller 682, as well as the drones 610*a-n* in the data storage system 600, and controls the transfer of components (e.g., data storage cartridges, data storage magazines, etc.) between data storage libraries 10*a-n* in the data storage system. In an exemplary embodiment, a master library controller may be a data storage controller. Data storage controller 630 may be a management server, a web server, or any other electronic device or computing system capable of receiving and sending data. In other embodiments, data storage controller 630 can represent a computing system utilizing clustered computers and components to act as a single pool of seamless resources when accessed through a network. In this exemplary embodiment, data storage controller 630 is capable of receiving requests for data or transfer of components (e.g., data storage cartridges, data storage magazines, etc.) from external host system 620, via network 640, determining the required actions, and/or converting the actions to physical movements of the drones 610*a-n* in the library. "Data storage controller" in its broadest sense is a device that includes at least one processor, and may include a plurality of processors, and optionally further circuitry, memory, and/or logic, and may include internal and external hardware components, as depicted and described in further detail with respect to FIG. 4.

In an embodiment, the data storage controller 630 may include or may be in communication with a data storage cartridge database. Data storage cartridge database is a central repository of data associated with data storage cartridges stored in various library locations and/or the vault storage of the data storage system 600. For example, the data storage cartridge database may include location and access information for each data storage cartridge located in data storage system 600. For example, the database may include library identification, data storage cartridge identification information (e.g., barcodes), element addresses, library shelf numbers, data storage cartridge positions within each library shelf, vault storage cell information, and the time of access of each data storage cartridge, among other information. In an exemplary embodiment, the data storage cartridge database is periodically or continuously updated based on information received from library controllers, the vault controller, robotic accessors, and/or drones. In an embodiment, library controllers, vault controller(s), and/or drones may also access information included in the data storage cartridge database.

In an embodiment, the data storage controller 630 processes requests for data or transfer of components (e.g., data storage cartridges, data storage magazines, etc.) from the external host system 620 by accessing the data storage cartridge database and determining a location of the requested data and/or data storage cartridge. In an alternate embodiment, the data storage controller 630 may request the location information directly from the library controllers 650*a-n* and/or the vault controller 682 since it is capable of optimizing, and communicating with, the various components within data storage system. The data storage controller 630 may then instruct the appropriate library controller to move the data storage cartridge from its storage slot to a pass-through portal or an I/O station of the library (e.g., using a robotic accessor).

In this exemplary embodiment, the data storage controller 630 also stores (and/or can access) the position and status of each of drone 610*a-n*, such as battery status, defects, and current usage status, and may identify one or more drones 610*a-n* to transfer the requested data storage cartridge to and/or from a data storage library and/or the vault storage. For example, the data storage controller 630 may receive position and status of each drone 610*a-n* from one or more drones and/or drone docking stations. The data storage controller 630 is capable of communicating with drones 610*a-n* to send data storage cartridge movement requests and/or read/write requests.

Referring back to FIG. 6, in an example embodiment, the data storage system 600 may also include a power station 660 configured to recharge, refuel and/or swap the energy storage and/or cell on a drone. The power station 660 may include a cradle, surface charger, or similar device as recognized by those skilled in the relevant art(s) as being capable of re-powering a drone. In another embodiment, the power station 660 may include robotic devices that may function to replace a component on a drone, such as, but not limited to, one or more batteries, super capacitors, fuel cells, or the like, on the drone or to make other repairs.

Figure 10:
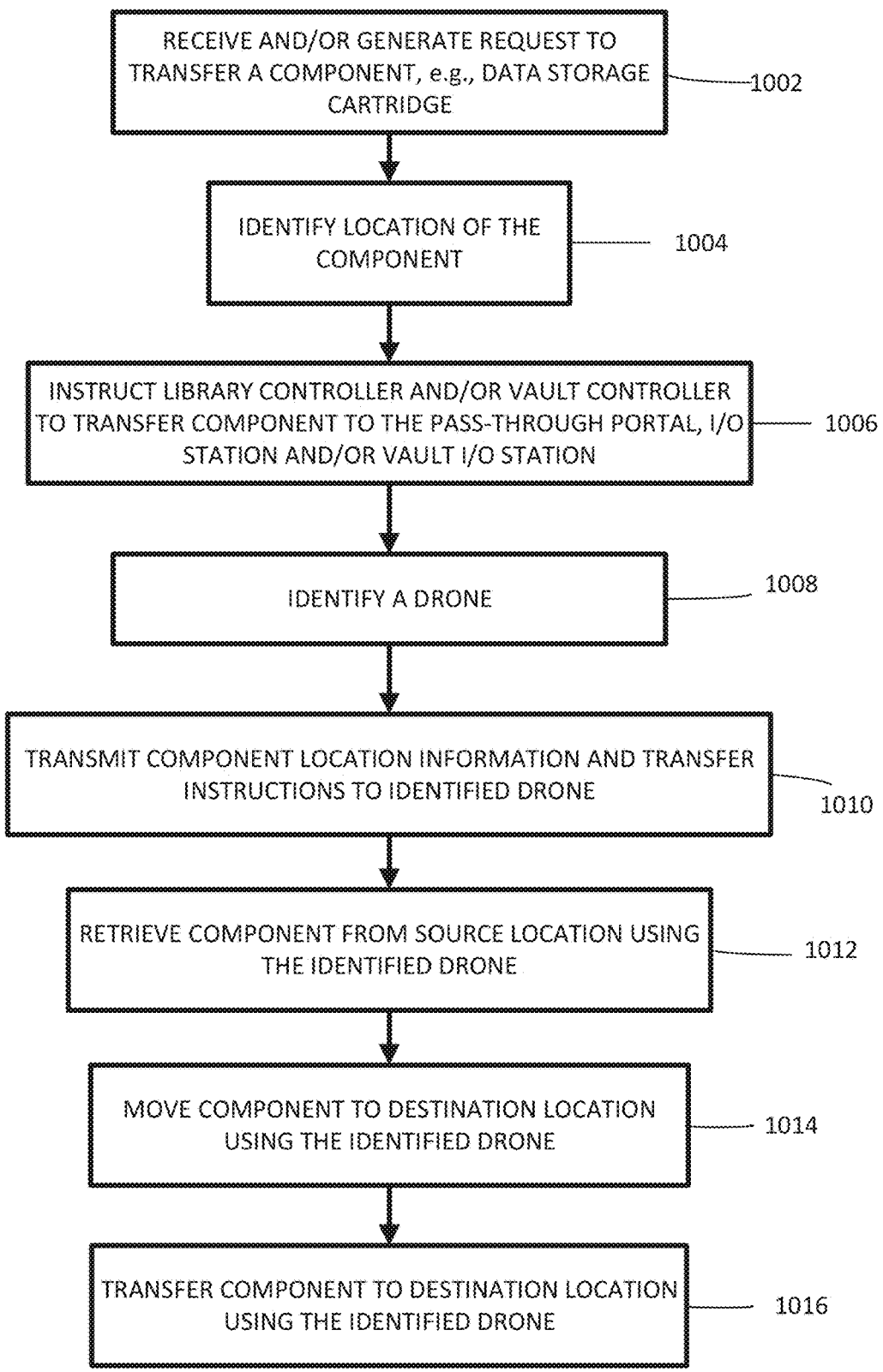
FIG. 10 is a flowchart illustrating an embodiment of a method of transferring data storage cartridges, data storage magazines, and/or other components in a data storage system.

FIG. 10 is an exemplary flowchart in accordance with one embodiment illustrating and describing a method of transferring data storage cartridges, data storage magazines, and/or other components to and/or from the data storage libraries and/or the vault storage in a data storage system. While the transfer method 1000 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 10, but the process may be integrated and/or one or more steps may be performed together, or the steps may be performed in the order disclosed or in an alternate order.

At 1002, a request is received and/or generated to transfer a component (e.g., a data storage cartridge, data storage magazine, etc.). In an example, a data storage controller associated with the data storage system receives a request to move a component (e.g., a data storage cartridge, data storage magazine, etc.) in the data storage system to a destination location (e.g., another data storage library and/or a vault storage). In an embodiment, the component may be located in an I/O station, a pass-through portal, and/or an accessor of a data storage library. Alternatively, and/or additionally, the component may be located in a vault storage cell, a vault I/O station, and/or a vault room. In an embodiment, the data storage controller may receive the request directly from an external host system.

At 1004, the data storage controller identifies the current location of the requested component (e.g., data storage cartridge, data storage magazine, etc.) within the data storage system. In an embodiment, the location information may include an identification of the data storage library and/or the vault storage that currently stores the component (e.g., data storage cartridge, data storage magazine, etc.) (the "source location") and an identification of the location of the component (e.g., storage slot) within the data storage library and/or the vault storage. In an exemplary embodiment, the data storage controller may access and search one or more database storage cartridge databases to determine the location of the component (e.g., data storage cartridge, data storage magazine, etc.) within the data storage system. In an alternate embodiment, the data storage controller may send a query to the library controllers associated with the libraries and/or the vault controller in the data storage system and receive the location from the library controllers and/or the vault controller. Alternatively, and/or additionally, the external host system may provide the component (e.g., data storage cartridge, data storage magazine, etc.) location in the data storage system.

At 1006, if the source location is inside a data storage library, the data storage controller instructs the library controller associated with the data storage library where the requested component (e.g., data storage cartridge, data storage magazine, etc.) is located (e.g., the identified source location) to retrieve the component (e.g., from the storage slot) and transfer it to a pass-through portal and/or I/O station of the source library. As discussed above, a library controller controls the movement of one or more robotic accessors of a library which may be used to transport components (e.g., data storage cartridges, data storage magazines, etc.) between the plurality of storage slots, the multi-cartridge deep slot storage cells, the data storage drives, the I/O stations, and/or pass-through portals of a library, and may transport the appropriate component (e.g., data storage cartridge, data storage magazine, etc.) to the I/O station and/or pass-through portal upon receiving instructions from the data storage controller. In an embodiment, the instruction to retrieve the component (e.g., data storage cartridge, data storage magazine, etc.) and transfer it to a pass-through portal and/or I/O station of the source library may include an estimated time that a drone may dock at the source library. For example, the data storage controller may receive an estimated time of docking from a drone or a docking station and transmit the same to the library controller.

In an alternate embodiment, if the source location is a vault storage cell inside a vault storage, the data storage controller may optionally instruct the vault controller to cause the transfer of the component (e.g., data storage cartridge, data storage magazine, etc.) to the vault I/O station (e.g., via a human operator and/or via a robotic accessor of the vault storage). Alternatively, and/or additionally, a drone may transfer a component (e.g. data storage cartridge) directly from a vault storage cell inside a vault storage.

At 1008, the data storage controller identifies a drone associated with the data storage system to receive the requested component (e.g., data storage cartridge, data storage magazine, etc.) from the source location and which will transfer the requested component (e.g., data storage cartridge, data storage magazine, etc.) to the destination location. In an exemplary embodiment, the data storage controller optimizes the movement of drones within the data storage system by choosing a drone which minimizes the time and/or resources required to complete the transfer based on, for example, distance of a drone from the source location and the destination location; position of other drones within the data storage system; status of other requests to transfer components (e.g., data storage cartridges, data storage magazines, etc.) to and/or from data storage libraries and/or vault storage; vacancy or availability of a docking station; availability of a drone; or other criteria. For example, the data controller may identify the drone which is closest to the source location and available to perform a transfer. As discussed below, drones not engaged in transferring a component (e.g., data storage cartridge, data storage magazine, etc.) preferably may be configured to be docked at a docking station. In an embodiment, a drone closest to the source location may be a drone attached to the docking station of the source location. Alternatively, a drone closest to the source location may be a drone attached to the docking station of a library and/or vault storage closest to the source location and/or a drone already in flight.

At 1010, the data storage controller transmits the location information for the requested/identified component (e.g., data storage cartridge, data storage magazine, etc.) to the control unit of the identified drone, which may also include instructions to deliver the component (e.g., data storage cartridge, data storage magazine, etc.) from a pass-through portal, I/O station, an accessor, vault storage cell, vault I/O station, and/or vault room of the source location to a pass-through portal, I/O station, accessor, vault storage cell, vault I/O station, and/or vault room of the destination location. The data storage controller may also send additional information to the drone such as, for example and without limitation, component (e.g., data storage cartridge, data storage magazine, etc.) identification information (e.g., barcodes, RFID, etc.), position of a pass-through portal, I/O station, accessor, vault storage cell, vault I/O station, and/or vault room at the source location, positions of a pass-through portal, I/O station, accessor, vault storage cell, vault I/O station, and/or vault room at the destination location, position of a docking station source and/or destination location, or the like. In an embodiment, the data storage controller may communicate directly with a drone. Alternatively and/or additionally, the data storage controller may communicate with a drone via a library controller of a library, a vault controller of a vault storage, and/or a docking controller of a docking station at which the drone is docked at the time of communication. In an alternate embodiment, the drone may receive information relating to the destination location and instructions to deliver the component (e.g., data storage cartridge, data storage magazine, etc.) from a source location to a destination location from the library controller and/or vault controller associated with the source location after it attaches to a docking station associated with and/or close to the source location. The drone may communicate and receive instructions and data wirelessly and/or through a wired connection, for example, while it is docked at a docking station.

In an embodiment, a source location docking station may be a docking station close to (i.e., makes a component accessible to an associated drone) and/or associated with a pass-through portal, I/O station, accessor, vault storage cell, vault I/O station, and/or vault room of the source location. Similarly, a destination location docking station may be a docking station close to and/or associated with a pass-through portal, I/O station, accessor, vault storage cell, vault I/O station, and/or vault room of the destination location.

At 1012, the identified drone flies to the source location docking station, associates with (e.g., attaches to) the source location docking station (if not already docked at the source location), and retrieves the component, e.g., data storage cartridge (e.g., transferred from the pass-through portal of the source location) from a pass-through portal, I/O station, accessor, vault storage cell, vault I/O station, and/or vault room of the source location, preferably via the gripper assembly. In an alternate embodiment, an accessor of the source location may place the component (e.g., data storage cartridge, data storage magazine, etc.) into a holding structure of the drone. For example, a securing latch associated with the holding structure may be opened to provide access to the holding structure, for example, by the accessor, automatically in response to docking of the drone, and/or in response to instructions from the docking controller.

In an embodiment, before retrieving the component (e.g., data storage cartridge, data storage magazine, etc.) from a pass-through portal, I/O station, accessor, vault storage cell, vault I/O station, and/or vault room of the source location, the drone may confirm that the component (e.g., data storage cartridge, data storage magazine, etc.) in the pass-through portal is the requested component (e.g., data storage cartridge, data storage magazine, etc.). In an exemplary embodiment, the drone may scan an identification tag (such as an RFID tag, barcode, an identifying image, or the like) on the component (e.g., data storage cartridge, data storage magazine, etc.) in the a pass-through portal, I/O station, accessor, vault storage cell, vault I/O station, and/or vault room, and determine whether the information in the identification tag matches the identification information previously received by the drone. If the information in the identification tag matches the identification information previously received by the drone, the drone may retrieve the component (e.g., data storage cartridge, data storage magazine, etc.). If the information in the identification tag does not match the identification information previously received by the drone, the drone may send an error message to the library controller and/or vault controller of the source location and/or the data storage controller (and/or may request updated location information).

At 1014, the identified drone flies to the destination location to deliver the retrieved component (e.g., data storage cartridge, data storage magazine, etc.). In an exemplary embodiment, the drone may proceed along a programmed and/or predetermined route from the source location to the destination location. Alternatively, and/or additionally, the drone may determine its own route based on various factors, such as altitude, distance to the destination location, obstacles (e.g., other flying drones, libraries, personnel, etc.), battery life of the drone, retrievability considerations, previous routes, or the like.

In 1016, the drone associates with (e.g., lands on and attaches to) the docking station of the destination location. The retrieved component (e.g., data storage cartridge, data storage magazine, etc.) is received at the pass-through portal, I/O station, accessor, vault storage cell, vault I/O station, and/or vault room of the destination location. In an embodiment, the data storage controller may then instruct the library controller associated with the destination location to retrieve the component (e.g., from the storage slot) from the pass-through portal and/or I/O station of the destination location and transfer it to a storage slot and/or a data storage drive of the source location. As discussed above, a library controller controls the movement of one or more robotic accessors of a library which may be used to transport components (e.g., data storage cartridge, data storage magazine, etc.s, data storage magazines, etc.) between the plurality of storage slots, the multi-cartridge deep slot storage cells, I/O stations, and/or pass-through portal of a library, and may transport the appropriate component (e.g., data storage cartridge, data storage magazine, etc.) from the pass-through portal upon receiving instructions from the data storage controller. In an alternate embodiment, if the destination location is a vault storage cell inside a vault storage, the data storage controller may optionally instruct the vault controller to cause the transfer of the component (e.g., data storage cartridge, data storage magazine, etc.) from the vault I/O station (e.g., via a human operator and/or via a robotic accessor of the vault storage) to the vault storage cell. Alternatively, and/or additionally, a drone may transfer a component (e.g. data storage cartridge) directly to the vault storage cell inside a vault storage.

In an embodiment, if another drone is already attached to the docking station of the destination location, the data storage controller (directly or via the destination location controller) may instruct that drone to vacate the destination docking station (e.g., fly to the source location and/or another vacant docking station) in the data storage system, in order to avoid collision. In an exemplary embodiment, the vacant docking station may be the source location docking station once the identified drone has taken flight to deliver the component (e.g., data storage cartridge, data storage magazine, etc.).

It will be appreciated that the system and method may include one or more drones 610a-n that are used to transfer one or more components (e.g., data storage cartridges, data storage magazines, etc.) to and/or from data storage libraries 10a-n and/or a vault storage maintained in a data storage system 600. In an exemplary embodiment, drones 610a-n of the current data storage system 600 may be configured to be docked at a docking station when not engaged in transferring components (e.g., data storage cartridges, data storage magazines, etc.). For example, a drone may remain docked at the docking station of a destination library (to which the drone delivered a data storage cartridge) until it receives a new instruction to transfer a component (e.g., data storage cartridge, data storage magazine, etc.). As such, a drone may receive power and communications via the landing structures and/or connectors when not engaged in transferring components (e.g., data storage cartridges, data storage magazines, etc.). Docking the drones when not actively transferring components (e.g., data storage cartridges, data storage magazines, etc.) may also prevent collisions by reducing the air traffic when the drones are not engaged in transferring and/or transporting components (e.g., data storage cartridges, data storage magazines, etc.). In an alternate embodiment, the drones may be docked at optimal positions computed based at least in part on the physical distribution of the components (e.g., data storage cartridges, data storage magazines, etc.) in the data storage system, physical distribution of the docking stations in the data storage system, physical distribution of the pass-through portals and/or I/O stations in the data storage system, location of the vault storage with respect to the data storage libraries, positions of and the number of drones in the data storage system (such as by minimizing the overall travel time for a docked drone to any library and/or the vault storage in the data storage system).

In one example, there could be one drone in the data storage system for each I/O station, for each pass-through portal, and/or for each vault I/O station. This may significantly improve the performance and throughput of the data storage system because a drone may always be docked at a source location in the data storage system. The drone transfer system can be used in addition to the robotic accessor system, in association with, and in conjunction with the robotic accessor system, or as an alternate to the robotic accessor system.

While the embodiments described herein describe a drone as attaching to a docking station of a source location before retrieving and/or transferring or placing a component (e.g., data storage cartridge, data storage magazine, etc.), it is to be understood that a drone may retrieve a component (e.g., data storage cartridge, data storage magazine, etc.) from a source location and/or transfer a component (e.g., data storage cartridge, data storage magazine, etc.) at a destination location without attaching to their respective docking stations, for example, while hovering over a pass-through portal, I/O station, accessor, vault storage cell, vault I/O station, and/or vault room.

In an embodiment, the new location of the data storage cartridge may be transmitted to a database, e.g. the data storage cartridge database, by a library controller, vault controller, and/or the drone. In an exemplary embodiment, the drone remains docked at the destination location docking station until the receipt of further instructions. In an alternate embodiment, the drone is instructed to fly to another vacant docking station identified based at least in part on the physical distribution of the components (e.g., data storage cartridges, data storage magazines, etc.) in the storage slots of the data storage system, the vault storage system, and/or likelihood (or status) of transfer requests.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage system, the system comprising:
a plurality of data storage libraries comprising a first data storage library for the storage, reading, and writing of data on a plurality of data storage components and a second data storage library for the storage of a plurality of data storage components,
at least one unmanned aerial vehicle (UAV);
a processing device; and
a non-transitory, computer-readable memory containing programming instructions that are configured to cause the processing device to:
receive a request to transfer a data storage component to a destination location, and
in response to receiving the request, instruct a UAV to transfer the data storage component to the destination location, and
wherein the first and second data storage library each have a docking station configured to associate with the UAV, each docking station having a docking structure configured to couple with and stabilize the UAV;
the UAV is configured, in response to receiving the instruction to transfer the data storage component to the destination location, to transfer the data storage component to the destination location.

2. The data storage system of claim 1, wherein the each of the plurality of data storage libraries comprises:
a data storage drive;
a plurality of data storage slots;

a library controller;
at least one of the group consisting of an import/export (I/O) station, a pass-through portal, a magazine slot and combinations thereof; and
one or more frames.

3. The data storage system of claim 1, wherein the docking station of the first data storage library and the second data storage library comprises:
a power source configured to supply power to a drone vehicle associated with that docking station.

4. The data storage system of claim 1, wherein the docking station further comprises a coupling interface configured to operably couple the docking station to the data storage library.

5. The data storage system of claim 1, wherein the docking structure comprises one or more docking aids configured to engage one or more landing structures of a UAV and form a stable attachment.

6. The data storage system of claim 5, wherein the one or more docking aids are selected from at least one of the group consisting of: slots, brackets, wedges, channels, tethers, grooves, recesses, latches, hooks, pins, and magnetic docking aids, and combinations thereof.

7. The data storage system of claim 1, wherein the at least one UAV comprises:
a flight assembly;
a frame;
one or more landing structures;
a power source;
a package holding and securing assembly; and
a UAV control unit comprising a UAV processing device and UAV memory.

8. The data storage system of claim 7, wherein the package holding and securing assembly comprises a gripper assembly configured to perform at least one of the group consisting of: retrieving, releasing, and holding a data storage component.

9. The data storage system of claim 7, wherein the package holding and securing assembly further comprises at least one of the group consisting of a storage slot, a magazine slot, and a holding structure for holding a data storage component during transfer.

10. The data storage system of claim 7, wherein the at least one UAV further comprises a scanner module configured to read information from a data storage component.

11. The data storage system of claim 1, wherein the destination location comprises at least one of the group consisting of an I/O station of a data storage library, an accessor of a data storage library, and a pass-through portal of a data storage library.

12. The data storage system of claim 1, wherein the data storage system further comprises a vault storage configured for long-term storage of a plurality of data storage cartridges.

13. The data storage system of claim 12, wherein the destination location comprises at least one of the group consisting of a vault storage cell, a vault magazine slot, and a vault I/O station.

14. The data storage system of claim 12 wherein the vault storage comprises a docking station configured to associate with a UAV, the vault docking station having a docking structure configured to couple with and stabilize a UAV.

15. The data storage system of claim 12, wherein the vault docking station comprises a power source configured to supply power to a UAV in response to the UAV being coupled with the vault docking station.

16. The data storage system of claim 1, wherein the system is configured so that the UAV transfers the data storage component from an initial location to the destination location, and the initial location is the docking station of the first data storage library and the destination location is the docking station of the destination location.

17. The data storage system of claim 1, wherein the initial location comprises the docking station associated with at least one of the group consisting of an I/O station of the first data storage library, an accessor of the first data storage library, and a pass-through portal of the first data storage library.

18. A data storage system, the system comprising:
a plurality of data storage libraries comprising a first data storage library for the storage, reading, and writing of data on a plurality of data storage components and a second data storage library for the storage of a plurality of data storage components,
at least one unmanned aerial vehicle (UAV), the UAV configured for transferring data storage components;
a first docking station, the first docking station associated with at least one of the group consisting of an I/O station of the first data storage library, a pass through portal of the first data storage library, and combinations thereof, the first docking station having a first docking structure configured to couple with and stabilize a UAV;
a second docking station, the second docking station associated with at least one of the group consisting of an I/O station of the second data storage library, a pass through portal of the second data storage library, and combinations thereof, the second docking station having a second docking structure configured to couple with and stabilize a UAV;
a processing device; and
a non-transitory, computer-readable memory containing programming instructions that are configured to cause the processing device to:
receive a request to transfer a data storage component to a destination location, and
in response to receiving the request, instruct a UAV to transfer the data storage component to the destination location, and
wherein the UAV is configured, in response to receiving the instruction to transfer the data storage component to the destination location, to transfer the data storage component to the destination location.

19. The data storage system of claim 18, wherein the second data storage library is a vault storage located in a room different than the first data storage library.

20. A data storage system, the system comprising:
a plurality of data storage libraries comprising a first data storage library for the storage, reading, and writing of data on a plurality of data storage components and a vault data storage library for the storage of a plurality of data storage components, the vault data storage library located in a room separate from the first data storage library;
at least one unmanned aerial vehicle (UAV), the UAV configured for transferring data storage components between at least the first data storage library and vault data storage library;
a first docking station, the first docking station associated with at least one of the group consisting of an I/O station of the first data storage library, a pass through portal of the first data storage library, and combinations thereof, the first docking station having a first docking structure configured to couple with and stabilize a UAV;

a second docking station, the second docking station associated with at least one of the group consisting of an I/O station of the vault data storage library, a pass through portal of the vault data storage library, and combinations thereof, the second docking station having a second docking structure configured to couple with and stabilize a UAV; and a processing device, wherein the processing device is configured to receive a request to transfer a data storage component to a destination location, and in response to receiving the request, instruct a UAV to transfer the data storage component to the destination location, and wherein the UAV is configured, in response to receiving the instruction to transfer the data storage component to the destination location, to transfer the data storage component to the destination location, wherein the destination location is at least one of the first docking station or the vault docking station.

* * * * *